US010565462B2

(12) United States Patent
Ohki et al.

(10) Patent No.: US 10,565,462 B2
(45) Date of Patent: Feb. 18, 2020

(54) ELECTRONIC APPARATUS, METHOD OF CONTROLLING ELECTRONIC APPARATUS, AND PROGRAM

(71) Applicant: Sony Corporation, Tokyo (JP)

(72) Inventors: Mitsuharu Ohki, Tokyo (JP); Nobuki Furue, Tokyo (JP); Yoshihito Ohki, Tokyo (JP); Keisuke Touyama, Tokyo (JP); Masahiro Watanabe, Tokyo (JP); Kensei Jo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/739,248

(22) PCT Filed: Feb. 28, 2017

(86) PCT No.: PCT/JP2017/007827
§ 371 (c)(1),
(2) Date: Dec. 22, 2017

(87) PCT Pub. No.: WO2017/203777
PCT Pub. Date: Nov. 30, 2017

(65) Prior Publication Data
US 2018/0189591 A1 Jul. 5, 2018

(30) Foreign Application Priority Data

May 23, 2016 (JP) ................................. 2016-102584

(51) Int. Cl.
*G06K 9/00* (2006.01)
*G06K 9/32* (2006.01)
(Continued)

(52) U.S. Cl.
CPC ............ *G06K 9/3208* (2013.01); *G01S 17/36* (2013.01); *G06K 9/2027* (2013.01); *G06T 7/521* (2017.01); *G06K 9/3258* (2013.01)

(58) Field of Classification Search
CPC ........ G01S 17/36; G01S 17/89; G01S 7/4814; G06K 9/2027; G06K 9/2036;
(Continued)

(56) References Cited

U.S. PATENT DOCUMENTS 5,960,379 A * 9/1999 Shimizu ............... G01B 11/255
356/511
5,986,745 A * 11/1999 Hermary ................ G01B 11/25
250/559.23
(Continued)

FOREIGN PATENT DOCUMENTS

JP 03-038789 A 2/1991
JP 2000-293627 A 10/2000
(Continued)

OTHER PUBLICATIONS

International Search Report and English translation thereof dated May 23, 2017, 2012 in connection with International Application No. PCT/JP2017/007827.
(Continued)

Primary Examiner — Bhavesh M Mehta
Assistant Examiner — Ian L Lemieux
(74) Attorney, Agent, or Firm — Wolf, Greenfield & Sacks, P.C.

(57) ABSTRACT

In an electronic apparatus that captures images, characters in an image are accurately recognized.
The electronic apparatus includes an imaging section, a distance measurement section, a shape estimation section, and a coordinate conversion section. The imaging section images an object and captures image data. The distance measurement section measures distances from the imaging section to a plurality of measurement points on a surface of the object. The shape estimation section estimates a shape of the object from the measured distances. The coordinate conversion section performs coordinate conversion on the image data, the coordinate conversion including converting three-dimensional coordinates on the surface of the object into plane coordinates on a predetermined reference plane on the basis of the estimated shape.

12 Claims, 23 Drawing Sheets

(51) Int. Cl.
*G06T 7/521* (2017.01)
*G01S 17/36* (2006.01)
*G06K 9/20* (2006.01)

(58) Field of Classification Search
CPC .. G06K 9/3208; G06K 9/3258; G06T 3/0031; G06T 7/521; H04N 13/254; H04N 5/2256
See application file for complete search history.

(56) References Cited

U.S. PATENT DOCUMENTS

| | | | | |
|---|---|---|---|---|
| 6,937,235 | B2* | 8/2005 | Fujiwara | G06T 17/30 345/420 |
| 2008/0024795 | A1* | 1/2008 | Yamamoto | G01B 11/2527 356/612 |
| 2014/0375762 | A1 | 12/2014 | Ohki | |
| 2015/0253428 | A1* | 9/2015 | Holz | G01S 17/42 356/5.01 |
| 2016/0267357 | A1* | 9/2016 | Smith | G06K 9/228 |
| 2018/0292206 | A1 | 10/2018 | Ohki | |
| 2018/0348369 | A1 | 12/2018 | Ohki | |

FOREIGN PATENT DOCUMENTS

| | | |
|---|---|---|
| JP | 2000-307947 A | 11/2000 |
| JP | 2003-323693 A | 11/2003 |

OTHER PUBLICATIONS

Written Opinion and English translation thereof dated May 23, 2017, in connection with International Application No. PCT/JP2017/007827.

International Preliminary Report on Patentability and English translation thereof dated Dec. 6, 2018, in connection with International Application No. PCT/JP2017/007827.

* cited by examiner

210

| Measurement point | Measured coordinate | | |
|---|---|---|---|
| | $X_0$ coordinate | $Y_0$ coordinate | $Z_0$ coordinate |
| P1 | 50 | 50 | 51 |
| P2 | 50 | 51 | 51 |
| P3 | 52 | 52 | 51 |
| ⋮ | ⋮ | ⋮ | ⋮ |

| Parameter \ Shape | Inclined planar shape | Columnar shape |
|---|---|---|
| Rotation matrix | Rp | Rc |
| Translational vector | Tp | Tc |
| Radius of colum | — | r |

FIG.5 a b a b a b

ELECTRONIC APPARATUS, METHOD OF CONTROLLING ELECTRONIC APPARATUS, AND PROGRAM

CROSS-REFERENCE TO RELATED APPLICATIONS

This application is a U.S. National Stage entry under 35 U.S.C. § 371 of International Application No. PCT/JP2017/007827, filed in the Japan Patent Office on Feb. 28, 2017, which claims priority to Patent Application No. JP2016-102584, filed in the Japan Patent Office on May 23, 2016, each of which is incorporated by reference herein in its entirety.

TECHNICAL FIELD

The present technology relates to an electronic apparatus, a method of controlling the electronic apparatus, and a program for causing a computer to execute the method. Specifically, the present technology relates to an electronic apparatus that performs character recognition, a method of controlling the electronic apparatus, and a program for causing a computer to execute the method.

BACKGROUND ART

In the past, the technology called optical character recognition (OCR) has been used in order to take in characters described on a printed matter with use of an information processing apparatus and perform processing thereon. For example, a system in which a sign on a road is imaged with a vehicle-mounted camera, and characters described in the sign are read by OCR for translation is proposed (see, e.g., Patent Literature 1).

CITATION LIST

Patent Literature

Patent Literature 1: Japanese Patent Application Laid-open No. 2003-323693

DISCLOSURE OF INVENTION

Technical Problem

In the conventional technology described above, the meanings of the characters described in the sign are recognized by optical character recognition. However, in the conventional technology described above, there is a problem that in a case where the characters are described on a curved surface or a surface inclined when viewed from a vehicle-mounted camera, the shapes of the characters are distorted and the optical character recognition cannot be accurately performed.

The present technology has been made in view of the circumstances as described above, and it is an object of the present technology to accurately recognize characters in an image in an electronic apparatus that captures images.

Solution to Problem

The present technology has been made so as to eliminate the problem described above. In a first aspect of the present technology, there are provided an electronic apparatus, a method of controlling the electronic apparatus, and a program for causing a computer to execute the method, the electronic apparatus including: an imaging section that images an object and captures image data; a distance measurement section that measures distances from the imaging section to a plurality of measurement points on a surface of the object; a shape estimation section that estimates a shape of the object from the measured distances; and a coordinate conversion section that performs coordinate conversion on the image data, the coordinate conversion including converting three-dimensional coordinates on the surface of the object into plane coordinates on a predetermined reference plane on the basis of the estimated shape. This produces an effect that the three-dimensional coordinates on the surface of the object are converted into the plane coordinates on the reference plane.

Further, in the first aspect, the electronic apparatus may further include a character recognition section that recognizes a character on the surface of the object in the image data that has been subjected to the coordinate conversion. This produces an effect that the character is recognized.

Further, in the first aspect, the electronic apparatus may further include an irradiation section that performs irradiation with irradiation light, in which the distance measurement section may measure the distances from a phase difference between reflected light of the irradiation light and the irradiation light. This produces an effect that the distances are measured from the phase difference between the reflected light and the irradiation light.

Further, in the first aspect, the imaging section may perform processing of capturing the image data and processing of receiving the irradiation light. This produces an effect that the image data is captured and the irradiation light is received in the identical imaging section.

Further, in the first aspect, the irradiation section may perform irradiation with pulsed light as the irradiation light, the pulsed light being in synchronization with a predetermined cycle signal. This produces an effect that irradiation with the pulsed light is performed.

Further, in the first aspect, the irradiation section may select spotlight or diffused light according to a predetermined operation and perform irradiation with the light as the irradiation light, and the distance measurement section may measure the distances when irradiation is performed with the diffused light. This produces an effect that irradiation with the spotlight or diffused light is performed.

Further, in the first aspect, the irradiation section may start irradiation with the irradiation light in a case where a predetermined button is pressed halfway down, and the imaging section may capture the image data in a case where the predetermined button is pressed all the way down. This produces an effect that irradiation with the irradiation light and imaging are performed according to an operation of the button.

Further, in the first aspect, the electronic apparatus may be a camera unit that is attached to a wearable terminal. This produces an effect that the three-dimensional coordinates on the surface of the object are converted into the plane coordinates on the reference plane in a camera unit.

Further, in the first aspect, the shape estimation section may estimate any one of a plurality of candidate shapes as the shape of the object on the basis of the distances. This produces an effect that any one of the plurality of candidate shapes is estimated as the shape of the object.

Further, in the first aspect, the shape estimation section may include a coordinate detection section that detects coordinates of the plurality of measurement points as measured coordinates on the basis of the distances, a function acquisition section that acquires, for each of the plurality of candidate shapes, a function representing a relationship between coordinates of a candidate shape and coordinates of a predetermined reference coordinate system by using the measured coordinates, an error computation section that computes an error at a time when the shape of the object is assumed for each of the plurality of candidate shapes on the basis of the acquired function and the measured coordinates, and an estimation processing section that estimates a shape having the smallest error in the plurality of candidate shapes as the shape of the object. This produces an effect that the shape having the smallest error in the plurality of candidate shapes is estimated as the shape of the object.

Further, in the first aspect, the image data may include a plurality of pixel data, the imaging section may include phase difference detection pixels that detect a phase difference between two pupil-split images, and normal pixels that perform photoelectric conversion on light and generate any of the plurality of pixel data, and the distance measurement section may measure the distances on the basis of the phase difference detected by the phase difference detection pixels. This produces an effect that the distances are measured on the basis of the phase difference detected by the phase difference detection pixels.

Advantageous Effects of Invention

According to the present technology, it is possible to produce an optimal effect that characters in an image can be accurately recognized in an electronic apparatus that captures images. It should be noted that the effects described herein are not necessarily limited and any one of the effects described herein may be produced.

BRIEF DESCRIPTION OF DRAWINGS

FIG. 4 is a diagram showing an example of measured coordinates in the first embodiment of the present technology.

FIG. 5 is a diagram showing an example of parameters in the first embodiment of the present technology.

MODE(S) FOR CARRYING OUT THE INVENTION

Hereinafter, modes for carrying out the present technology (hereinafter referred to as embodiments) will be described. The description will be given in the following order.

1. First Embodiment (example of estimating shape and performing coordinate conversion)

2. Second Embodiment (example of estimating shape on the basis of results of distance measurement using phase difference detection pixels and performing coordinate conversion)

<1. First Embodiment>
[Configuration Example of Electronic Apparatus]

Figure 1:
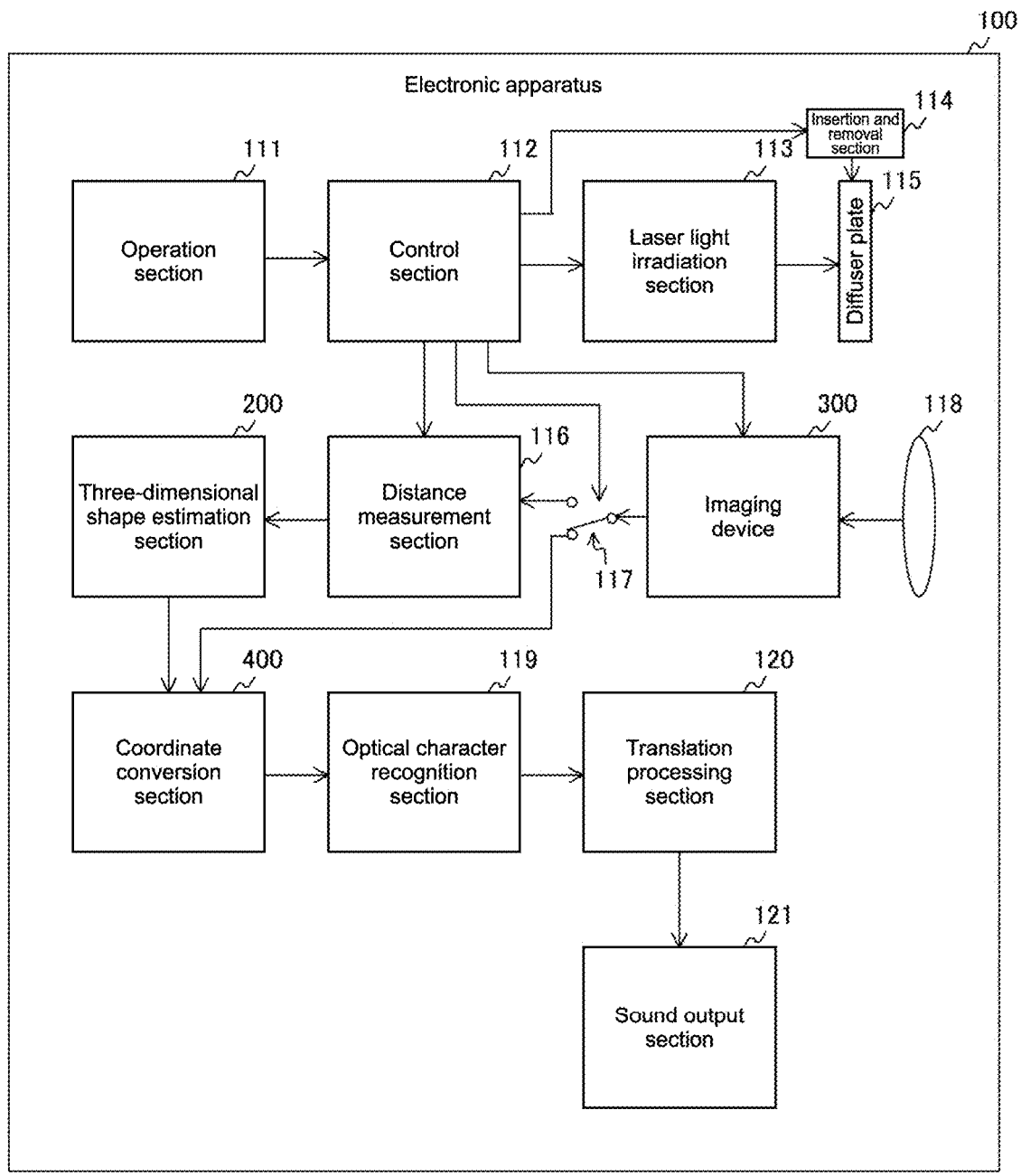
FIG. 1 is a block diagram showing a configuration example of an electronic apparatus in a first embodiment of the present technology.

FIG. 1 is a block diagram showing a configuration example of an electronic apparatus 100 in a first embodiment. The electronic apparatus 100 includes an operation section 111, a control section 112, a laser light irradiation section 113, an insertion and removal section 114, a diffuser plate 115, a three-dimensional shape estimation section 200, a distance measurement section 116, a switch 117, and an imaging device 300. Further, the electronic apparatus 100 includes an imaging lens 118, a coordinate conversion section 400, an optical character recognition section 119, a translation processing section 120, and a sound output section 121.

The operation section 111 generates an operation signal according to a user operation on a button or a switch. The electronic apparatus 100 is provided with, for example, a button capable of being pressed down in two stages. The operation section 111 generates an operation signal indicating any one of a state where that button is not pressed down, a state where that button is pressed halfway down, and a state where that button is pressed all the way down, and supplies the operation signal to the control section 112.

The laser light irradiation section 113 performs irradiation with visible light (red light and the like) having directivity, as laser light, in a predetermined direction under the control of the control section 112. The laser light is applied in, for example, a direction substantially parallel to an optical axis direction of the imaging lens 118. It should be noted that the laser light irradiation section 113 is an example of an irradiation section described in the Claims.

The insertion and removal section 114 performs processing of inserting the diffuser plate 115 into an optical path of the laser light or processing of removing the diffuser plate 115 from the optical path under the control of the control section 112. The insertion and removal section 114 is achieved by an actuator such as a motor.

The diffuser plate 115 diffuses the laser light. Before insertion of the diffuser plate 115, the shape of the laser light is spot-like. Meanwhile, after insertion of the diffuser plate 115, the laser light is diffused and becomes circular, for example. It should be noted that the shape of the diffused laser light is not limited to be circular and may be linear or triangular.

Further, switching of the shape of the laser light can be achieved by using, for example, one similar to a laser pointer LP-RD312BKN manufactured by SANWA SUPPLY INC. or a laser pointer ELP-G20 manufactured by KOKUYO Co., Ltd., as the laser light irradiation section 113.

The imaging lens 118 condenses the light and guides the light to the imaging device 300. The imaging device 300 images an object and generates image data under the control of the control section 112. In the imaging device 300, a plurality of pixels arrayed in a two-dimensional lattice manner are disposed. Each of the pixels generates pixel data having a level corresponding to the amount of light received. The imaging device 300 supplies image data including those pieces of pixel data to the switch 117. It should be noted that the imaging lens 118 and the imaging device 300 are an example of an imaging section described in the Claims.

The switch 117 switches an output destination of the image data from the imaging device 300 under the control of the control section 112. The switch 117 outputs the image data to any of the distance measurement section 116 and the coordinate conversion section 400.

The distance measurement section 116 measures distances from the imaging device 300 to a plurality of measurement points on the object under the control of the control section 112. Here, the measurement point is a point irradiated with the diffused laser light. The distance measurement section 116 measures a distance on the basis of a phase difference between the applied laser light and reflected light to that laser light. This distance measurement method is called a ToF (Time of Flight) method. The distance measurement section 116 supplies distance information to the three-dimensional shape estimation section 200, the distance information indicating a distance of each of the measurement points.

The three-dimensional shape estimation section 200 estimates the shape of the object on the basis of the distance information. The three-dimensional shape estimation section 200 supplies parameters associated with the estimated shape of the object to the coordinate conversion section 400. Details of the parameters will be described later. It should be noted that the three-dimensional shape estimation section 200 is an example of a shape estimation section described in the Claims.

The coordinate conversion section 400 performs predetermined coordinate conversion on the image data by using the parameters from the three-dimensional shape estimation section 200. The coordinate conversion is processing of converting coordinates on a surface of the object irradiated with the laser light into coordinates on a predetermined reference plane. For example, a plane parallel to (i.e., facing) an image plane of the imaging device 300 is used as a reference plane. The coordinate conversion section 400 supplies the image data, which has been subjected to the coordinate conversion, to the optical character recognition section 119.

The control section 112 controls the entire electronic apparatus 100. When a predetermined button is pressed halfway down, the control section 112 controls the laser light irradiation section 113 to start consecutive irradiation with the laser light. Further, the control section 112 causes the insertion and removal section 114 to remove the diffuser plate 115.

When the button is then pressed all the way down, the control section 112 controls the laser light irradiation section 113 to start intermittent irradiation with the laser light. For example, the control section 112 supplies a light emission control signal CLKp of a square wave or a sine wave to the laser light irradiation section 113, and the laser light irradiation section 113 emits light in synchronization with that signal. With this control, pulsed light with the frequency of, for example, 20 megahertz (MHz) is applied.

Further, when the button is pressed all the way down, the control section 112 causes the insertion and removal section 114 to insert the diffuser plate 115. Furthermore, the control section 112 controls the imaging device 300 to capture image data. The control section 112 then controls the switch 117 to supply the image data to the distance measurement section 116 and causes the distance measurement section 116 to measure a distance over a fixed distance measurement period.

After the elapse of the distance measurement period, the control section 112 controls the imaging device 300 to capture image data again. Further, the control section 112 controls the switch 117 to supply the image data to the coordinate conversion section 400.

The optical character recognition section 119 performs OCR on the image data. The optical character recognition section 119 supplies a result of the OCR to the translation processing section 120.

The translation processing section 120 performs translation processing of replacing a language (Japanese etc.) of a text including characters recognized by the OCR with another predetermined language (English etc.). The translation processing section 120 supplies a result of the translation processing to the sound output section 121. The sound output section 121 outputs the result of the translation of the translation processing section 120 with use of sound.

It should be noted that although the sections such as the laser light irradiation section 113 and the imaging device 300 are provided within one apparatus (electronic apparatus 100), those sections may be dispersedly provided in a plurality of apparatuses. For example, the laser light irradiation section 113, the insertion and removal section 114, and the diffuser plate 115 may be provided within an external laser pointer unit that is externally provided to the electronic apparatus 100. Further, the optical character recognition section 119 and the translation processing section 120 may be provided to an information processing apparatus outside the electronic apparatus 100. In this case, the electronic apparatus 100 only needs to send image data and character information to that information processing apparatus and receive a result of OCR or translation.

Further, although the electronic apparatus 100 performs OCR, the electronic apparatus 100 may perform processing other than the OCR on the image data. For example, the electronic apparatus 100 may perform processing of recognizing a particular object (face etc.) or a two-dimensional bar code, instead of the OCR. Further, although the electronic apparatus 100 outputs a result of the translation with use of sound, the result of the translation may be displayed on a display section such as a liquid crystal monitor.

[Configuration Example of Three-dimensional Shape Estimation Section]

Figure 2:
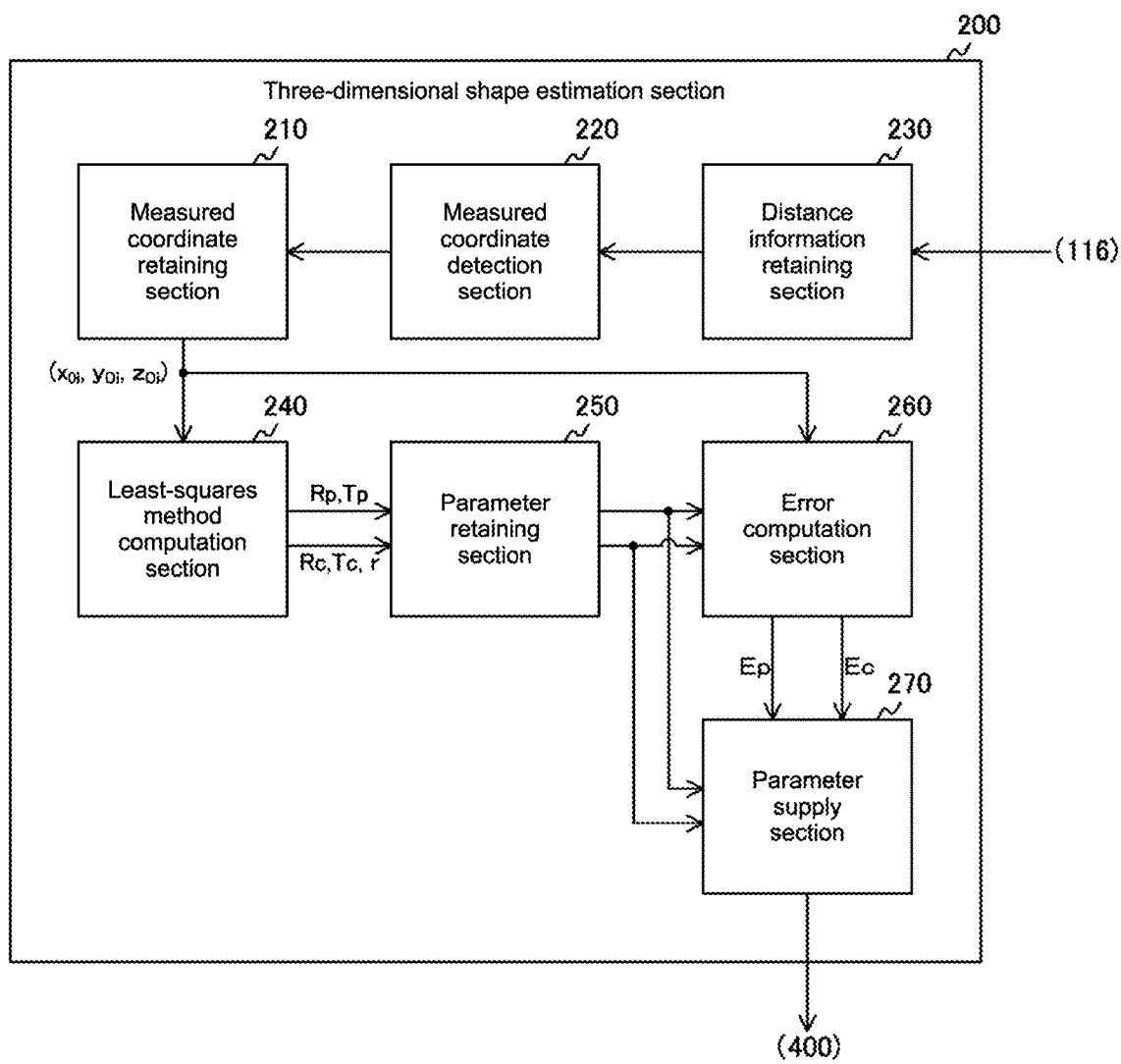
FIG. 2 is a block diagram showing a configuration example of a three-dimensional shape estimation section in the first embodiment of the present technology.

FIG. 2 is a block diagram showing a configuration example of the three-dimensional shape estimation section 200 in the first embodiment. The three-dimensional shape estimation section 200 includes a measured coordinate retaining section 210, a measured coordinate detection section 220, a distance information retaining section 230, a least-squares method computation section 240, a parameter retaining section 250, an error computation section 260, and a parameter supply section 270.

The distance information retaining section 230 retains the distance information indicating a distance of each of the measurement points, which is measured by the distance measurement section 116.

The measured coordinate detection section 220 detects three-dimensional coordinates in a predetermined reference coordinate system for each of the measurement points, as measured coordinates, on the basis of the distance information. For the reference coordinate system, for example, a coordinate system including an $X_0$ axis and a $Y_0$ axis that are parallel to the image plane of the imaging device 300 and a $Z_0$ axis perpendicular to the image plane is used. The measured coordinate detection section 220 acquires in advance an angle defined by the direction of the diffused laser light and the predetermined reference axis (such as $X_0$, $Y_0$, and $Z_0$ axes) and, using a trigonometric function based on the angle and the measured distance, computes the measured coordinates for each of the measurement points. The measured coordinate detection section 220 causes the measured coordinate retaining section 210 to retain the measured coordinates for each of the measurement points. Hereinafter, the number of measurement points is represented by N (N is an integer of 2 or more), and measured coordinates of the i-th (i is an integer from 0 to N−1) measurement point are represented by ($x_{0i}$, $y_{0i}$, $z_{0i}$).

The least-squares method computation section 240 computes a function that most fits a measured coordinate group for each of candidate shapes by using the least-squares method. The plurality of candidate shapes include, for example, a planar shape inclined to the reference plane and a columnar shape. Further, here, the function obtained by the computation is a function indicating a relationship between coordinates in the coordinate system of the candidate shape and coordinates in the reference coordinate system.

Here, assuming that a coordinate system including an Xp axis, a Yp axis, and a Zp axis orthogonal to one another is a planar coordinate system on an inclined plane, a relationship between coordinates in the planar coordinate system and coordinates in the reference coordinate system is expressed by, for example, the following expression.

$$\begin{bmatrix} x_{pi} \\ y_{pi} \\ z_{pi} \end{bmatrix} = R_p \begin{bmatrix} x_{0i} \\ y_{0i} \\ z_{0i} \end{bmatrix} + T_p \qquad \text{Expression 1}$$

In the above expression, ($x_{pi}$, $y_{pi}$, $z_{pi}$) represent the coordinates in the planar coordinate system. Further, Rp represents a rotation matrix and is expressed by the following expression.

$$Rp = Rxp \cdot Ryp \cdot Rzp$$

In the above expression, Rxp represents a rotation matrix in the rotation about the $x_0$ axis by an angle $tr_{xp}$. Further, Ryp represents a rotation matrix in the rotation about the $y_0$ axis by an angle $tr_{yp}$, and Rzp is a rotation matrix in the rotation about the $z_0$ axis by an angle $tr_{zp}$.

Further, Tp represents a translational vector including an $x_0$ component, a $y_0$ component, and a $z_0$ component. The values of those $x_0$ component, $y_0$ component, and $z_0$ component are represented by A, B, and C.

When a measurement point is positioned on an Xp-Yp plane, a Zp component of the coordinates of the measurement point should be zero. Because of this, when the Zp component is not zero, this component is treated as an error. By the following expression, Rp and Tp at the time when a sum of the squared errors Ep is the smallest are obtained.

$$E_p = \sum_i (z_{pi}^2) \qquad \text{Expression 2}$$

In order to solve the above expression, for example, used is a partial differentiation method of partially differentiating both the sides of the above expression with $tr_{xp}$, $tr_{yp}$, $tr_{zp}$, A, B, and C.

Next, assuming that a coordinate system including an Xc axis, a Yc axis, and a Zc axis orthogonal to one another is a columnar coordinate system as a column, a relationship between coordinates in the columnar coordinate system and the coordinates in the reference coordinate system is expressed by, for example, the following expression.

$$\begin{bmatrix} x_{ci} \\ y_{ci} \\ z_{ci} \end{bmatrix} = R_c \begin{bmatrix} x_{0i} \\ y_{0i} \\ z_{0i} \end{bmatrix} + T_c \qquad \text{Expression 3}$$

In the above expression, ($x_{ci}$, $y_{ci}$, $z_{ci}$) represent the coordinates in the columnar coordinate system. Further, Rc represents a rotation matrix and is expressed by the following expression.

$$Rc = Rxc \cdot Ryc \cdot Rzc$$

In the above expression, Rxc represents a rotation matrix in the rotation about the $x_0$ axis by an angle $tr_{xc}$. Further, Ryc represents a rotation matrix in the rotation about the $y_0$ axis by an angle $tr_{yc}$, and Rzc is a rotation matrix in the rotation about the $z_0$ axis by an angle $tr_{zc}$. r is a radius of the column.

Further, Tc represents a translational vector including an $x_0$ component, a $y_0$ component, and a $z_0$ component. The values of those $x_0$ component, $y_0$ component, and $z_0$ component are represented by D, E, and F.

Assuming that r is a radius of the column, when a measurement point is positioned on a surface of the column, a sum of squares of Xc and Zc coordinates of the measurement point should be equal to the square of r. Because of this, when a difference therebetween is not zero, this difference is treated as an error. By the following expression, Rc, Tc, and r at the time when a sum of the squared errors Ec is the smallest are obtained.

$$E_c = \sum_i (x_{ci}^2 + z_{ci}^2 - r^2)$$ Expression 4

In order to solve the above expression, for example, used is a partial differentiation method of partially differentiating both the sides of the above expression with $tr_{xc}$, $tr_{yc}$, $tr_{zc}$, D, E, and F.

The least-squares method computation section 240 causes the parameter retaining section 250 to retain the obtained parameter group of Rp and Tp and parameter group of Rc, Tc, and r.

The error computation section 260 computes, by using the parameters corresponding to a candidate shape for each of the candidate shapes, the error at the time when that shape is assumed. The error computation section 260 computes the sum of the squared errors Ep corresponding to the inclined planar shape and the sum of the squared errors Ec corresponding to the columnar shape by using, for example, Expressions 2 and 4, and supplies the sums Ep and Ec to the parameter supply section 270.

The parameter supply section 270 estimates any one of the plurality of candidate shapes, as the shape of an actual object, on the basis of the errors. The parameter supply section 270 compares the sum of the squared errors Ep and the sum of the squared errors Ec with each other and estimates a candidate shape corresponding to one having a smaller value as the shape of the object. The parameter supply section 270 then reads a parameter group corresponding to that shape from the parameter retaining section 250 and supplies the parameter group to the coordinate conversion section 400, together with identification information of the estimated shape. It should be noted that the parameter supply section 270 is an example of an estimation processing section described in the Claims.

It should be noted that the three-dimensional shape estimation section 200 assumes the two candidate shapes, i.e., a planar shape and a columnar shape to estimate the shape, but the types of the candidate shapes are not limited thereto. The candidate shapes may be, for example, a sphere or a cube. Further, the number of candidate shapes is not limited to two and may be three or more. In a case where the number of candidate shapes is three or more, the parameter supply section 270 estimates a candidate shape having the smallest errors as the shape of the object.

Figure 3:
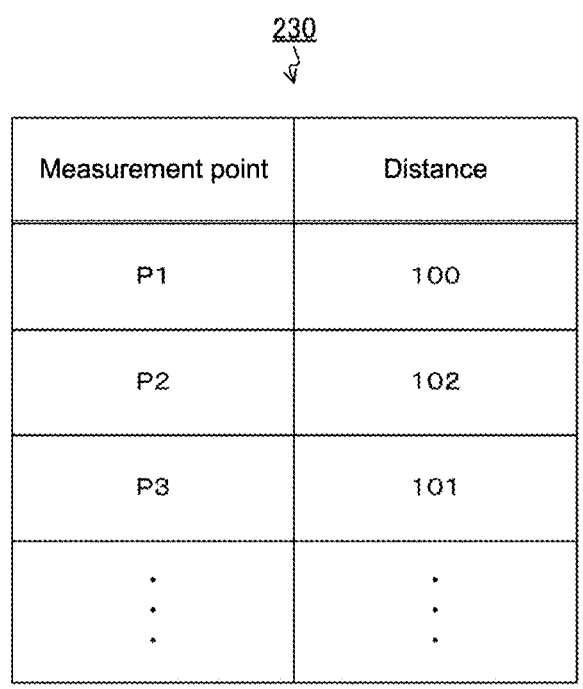
FIG. 3 is a diagram showing an example of distance information in the first embodiment of the present technology.

FIG. 3 is a diagram showing an example of the distance information in the first embodiment. The distance information includes a distance from the imaging lens 118 to the measurement point for each of the measurement points. For example, in a case where a distance to a measurement point P1 is 100 meters and a distance to a measurement point P2 is 102 meters, the three-dimensional shape estimation section 200 retains "100" corresponding to P1 and "102" corresponding to P2 in the distance information retaining section 230.

FIG. 4 is a diagram showing an example of the measured coordinates in the first embodiment. The measured coordinates on the $X_0$, $Y_0$, and $Z_0$ axes are calculated for each of the measurement points on the basis of the distances to the measurement points and the angle of irradiation with laser light. It is assumed that 50, 50, and 51 are respectively calculated as an $X_0$ coordinate, a $Y_0$ coordinate, and a $Z_0$ coordinate at the measurement point P1, and 50, 51, and 51 are respectively calculated as an $X_0$ coordinate, a $Y_0$ coordinate, and a $Z_0$ coordinate at the measurement point P2. In this case, the three-dimensional shape estimation section 200 retains the measured coordinates (50, 50, 51) corresponding to the measurement point P1 and the measured coordinates (50, 51, 51) corresponding to the measurement point P2 in the measured coordinate retaining section 210.

FIG. 5 is a diagram showing an example of the parameters in the first embodiment. The function of Expression 1 corresponding to the planar shape includes the parameters of the rotation matrix Rp and the translational vector Tp. The function of Expression 2 corresponding to the columnar shape includes the parameters of the rotation matrix Rc, the translational vector Tc, and the radius r. The three-dimensional shape estimation section 200 calculates those parameters by the least-squares method and retains those parameters in the parameter retaining section 250.

[Configuration Example of Imaging Device]

Figure 6:
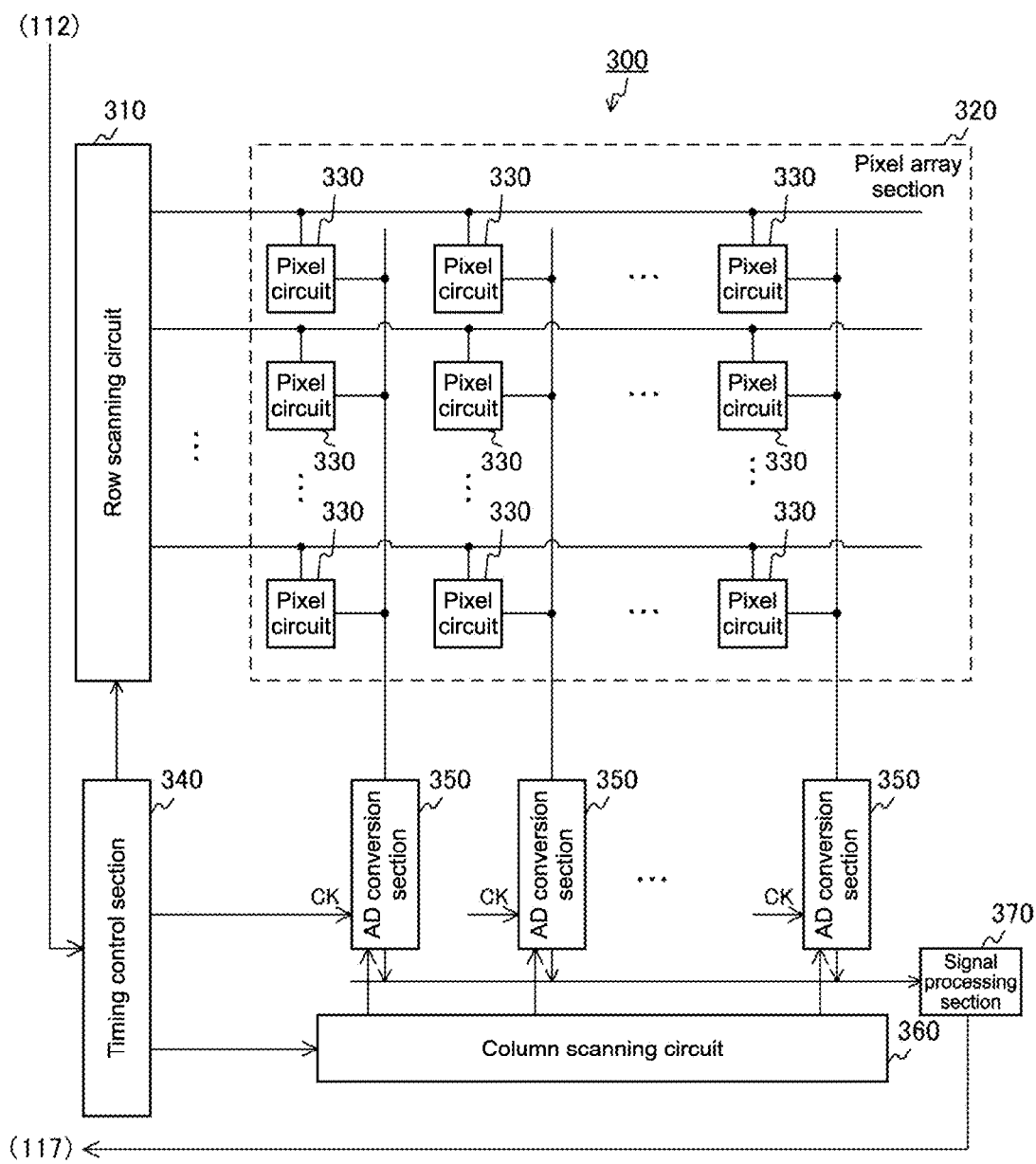
FIG. 6 is a block diagram showing a configuration example of an imaging device in the first embodiment of the present technology.

FIG. 6 is a block diagram showing a configuration example of the imaging device 300 in the first embodiment. The imaging device 300 includes a row scanning circuit 310, a pixel array section 320, a timing control section 340, a plurality of AD (Analog to Digital) conversion sections 350, a column scanning circuit 360, and a signal processing section 370. The pixel array section 320 includes a plurality of pixel circuits 330 disposed in a two-dimensional lattice manner. Hereinafter, an aggregation of the pixel circuits 330 arrayed in a predetermined direction is referred to as a "row", and an aggregation of the pixel circuits 330 arrayed in a direction perpendicular to the row is referred to as a "column". The AD conversion sections 350 described above are provided for each of the columns.

The timing control section 340 controls the row scanning circuit 310, the AD conversion sections 350, and the column scanning circuit 360 in synchronization with a vertical synchronization signal.

The row scanning circuit 310 causes all the rows to be exposed simultaneously, and after the end of exposure, selects the rows in sequence so as to cause the rows to output pixel signals. The pixel circuits 330 output pixel signals each having a level corresponding to the amount of light received, under the control of the row scanning circuit 310.

The AD conversion sections 350 each AD-convert the pixel signals from the column corresponding thereto. The AD conversion sections 350 output the AD-converted pixel signals as pixel data to the signal processing section 370 under the control of the column scanning circuit 360. The column scanning circuit 360 selects the AD conversion sections 350 in sequence and causes the AD conversion sections 350 to output the pixel data.

The signal processing section 370 performs signal processing such as CDS (Correlated Double Sampling) processing on image data including the pixel data. The signal processing section 370 supplies the image data after having been subjected to the signal processing to the switch 117.

[Configuration Example of Pixel Circuit]

Figure 7:
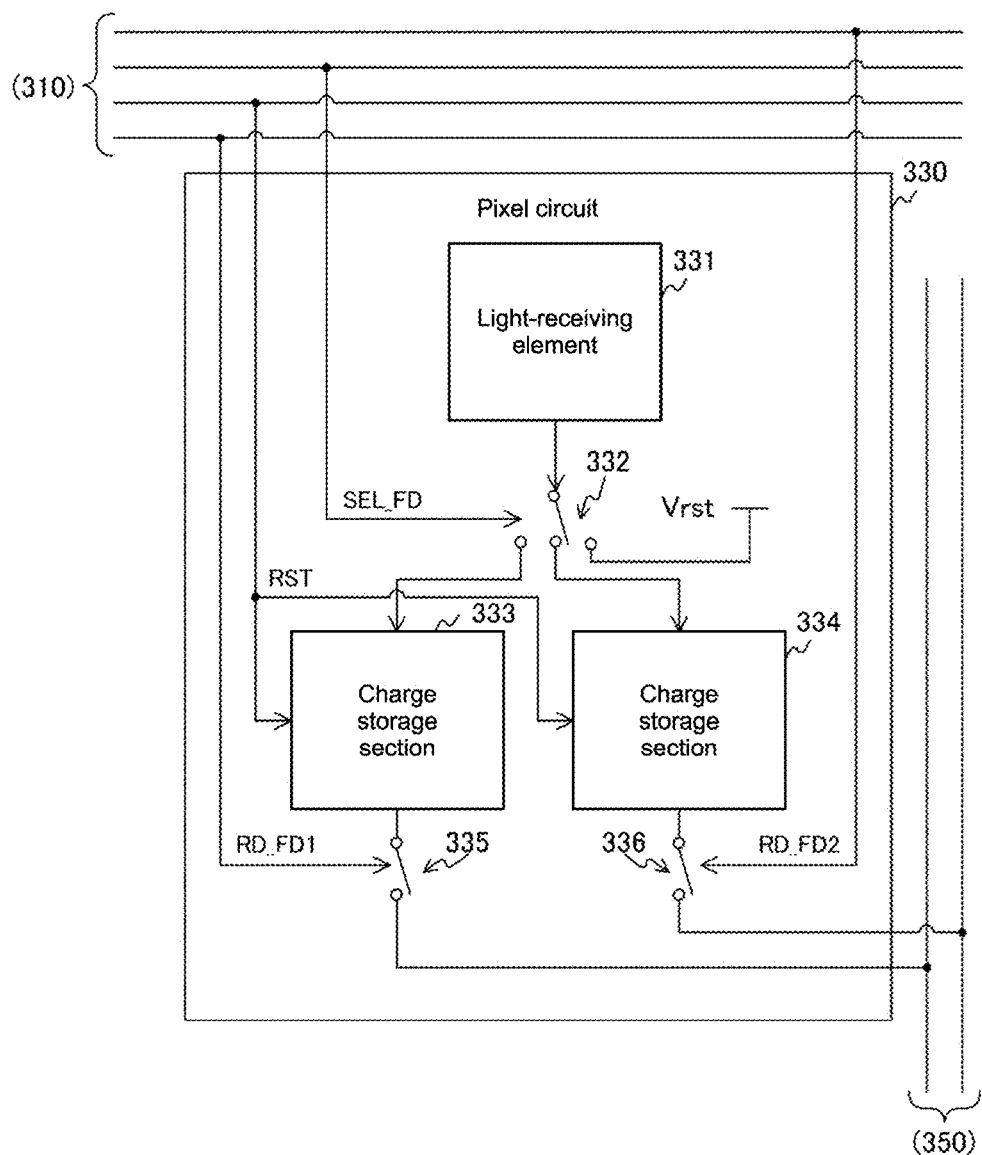
FIG. 7 is a block diagram showing a configuration example of a pixel circuit in the first embodiment of the present technology.

FIG. 7 is a block diagram showing a configuration example of the pixel circuit 330 in the first embodiment. The pixel circuit 330 includes a light-receiving element 331, a transfer switch 332, charge storage sections 333 and 334, and selector switches 335 and 336.

The light-receiving element 331 performs photoelectric conversion on light and generates charge. For the light-receiving element 331, for example, a photodiode is used.

The transfer switch 332 connects the light-receiving element 331 to any one of the charge storage section 333, the charge storage section 334, and a reset power supply Vrst under the control of the row scanning circuit 310. The transfer switch 332 is achieved by, for example, a plurality of MOS (Metal-Oxide-Semiconductor) transistors. When the light-receiving element 331 is connected to the reset power supply Vrst, charge output from the drains of the MOS transistors is cancelled, and the charge of the light-receiving element 331 is initialized.

The charge storage sections 333 and 334 store charge and generates a voltage corresponding to the amount of stored charge. For those charge storage sections 333 and 334, for example, a floating diffusion layer is used.

The selector switch 335 opens and closes a pathway between the charge storage section 333 and the AD conversion section 350 under the control of the row scanning circuit 310. The selector switch 336 opens and closes a pathway between the charge storage section 334 and the AD conversion section 350 under the control of the row scanning circuit 310. For example, when an FD read signal RD_FD1 is supplied by the row scanning circuit 310, the selector switch 335 is changed into the closed state, and when an FD read signal RD_FD2 is supplied by the row scanning circuit 310, the selector switch 336 is changed into the closed state. Each of those selector switches 335 and 336 is achieved by, for example, the MOS transistor.

[Configuration Example of Coordinate Conversion Section]

Figure 8:
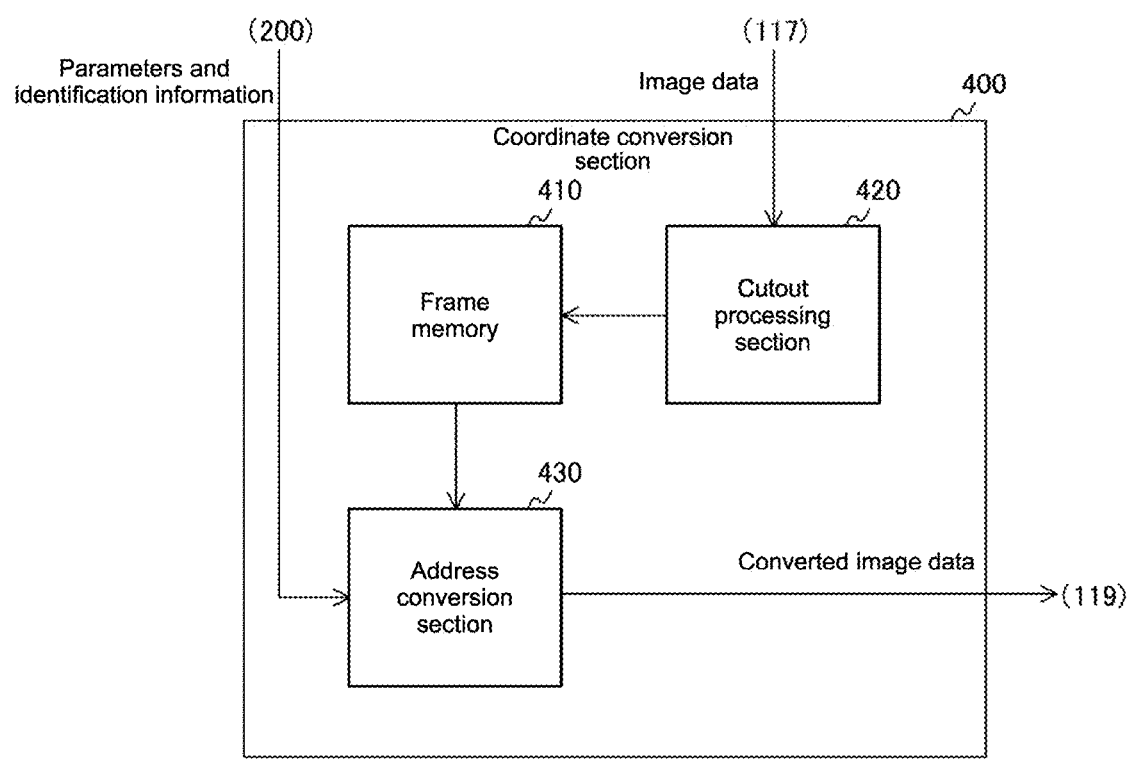
FIG. 8 is a block diagram showing a configuration example of a coordinate conversion section in the first embodiment of the present technology.

FIG. 8 is a block diagram showing a configuration example of the coordinate conversion section 400 in the first embodiment. The coordinate conversion section 400 includes a cutout processing section 420, a frame memory 410, and an address conversion section 430.

The cutout processing section 420 cuts out a region having a predetermined shape (e.g., rectangle) including a part surrounded by the circular laser light in the image data. The cutout processing section 420 causes the frame memory 410 to retain the region cut out as a cutout region. The frame memory 410 retains the cutout region.

The address conversion section 430 converts, for each of the pixels within the cutout region, the coordinates thereof into coordinates in the reference plane. The coordinate conversion section 400 receives identification information of the shape estimated by the three-dimensional shape estimation section 200, and the parameter group of the shape. When the shape is estimated as a planar shape, the rotation matrix Rp and the translational vector Tp of Expression 1 are supplied as parameters to the coordinate conversion section 400. Meanwhile, when the shape is estimated as a three-dimensional shape, the rotation matrix Rc, the translational vector Tc, and the radius r of Expression 2 are supplied as parameters to the coordinate conversion section 400.

When the shape is estimated as a planar shape, a positional relationship between coordinates $(u_i, v_i)$ on the imaging device 300 and coordinates $(x_{ei}, y_{ei})$ on the inclined plane is expressed by the following expression using the parameters Rp and Tp.

$$u_{0i} = f \times \frac{x_{0i}}{z_{0i}}, \quad \text{Expression 5}$$
$$v_{0i} = f \times \frac{y_{0i}}{z_{0i}}, \text{ where}$$
$$\begin{bmatrix} x_{0i} \\ y_{0i} \\ z_{0i} \end{bmatrix} = R_p^{-1} \left( \begin{bmatrix} x_{ei} \\ y_{ei} \\ 0 \end{bmatrix} - T_p \right)$$

In the above expression, f represents a focal length. The address conversion section 430 outputs a pixel value of the coordinates $(u_i, v_i)$ in the image (cutout region) retained in the frame memory 410 by using the above expression, as a pixel value of the coordinates $(x_{ei}, y_{ei})$ on the reference plane. As a result, the address conversion section 430 can generate an image facing the image plane.

Meanwhile, when the shape is estimated as a columnar shape, a positional relationship between coordinates $(u_i, v_i)$ on the imaging device 300 and coordinates $(x_{ei}, y_{ei})$ on the column is expressed by the following expression using the parameters Rp, Tp, and r.

$$u_{0i} = f \times \frac{x_{0i}}{z_{0i}}, \quad \text{Expression 6}$$
$$v_{0i} = f \times \frac{y_{0i}}{z_{0i}}, \text{ where}$$
$$\begin{bmatrix} x_{0i} \\ y_{0i} \\ z_{0i} \end{bmatrix} = R_c^{-1} \left( \begin{bmatrix} x_{ci} \\ y_{ci} \\ z_{ci} \end{bmatrix} - T_c \right),$$
$$\begin{bmatrix} x_{ci} \\ y_{ci} \\ z_{ci} \end{bmatrix} = \begin{bmatrix} r \times \sin(x_{ei}/r) \\ y_{ei} \\ -r \times \cos(x_{ei}/r) \end{bmatrix}$$

The address conversion section 430 outputs a pixel value of the coordinates $(u_i, v_i)$ in the image retained in the frame memory 410 by using the above expression, as a pixel value of the coordinates $(x_{ei}, y_{ei})$ on the reference plane. As a result, the address conversion section 430 can generate an image facing the image plane.

It should be noted that the coordinate conversion section 400 cuts out only the periphery of the part surrounded by the laser light and performs coordinate conversion thereon, but may perform coordinate conversion on the entire image without performing cutout.

Figure 9:
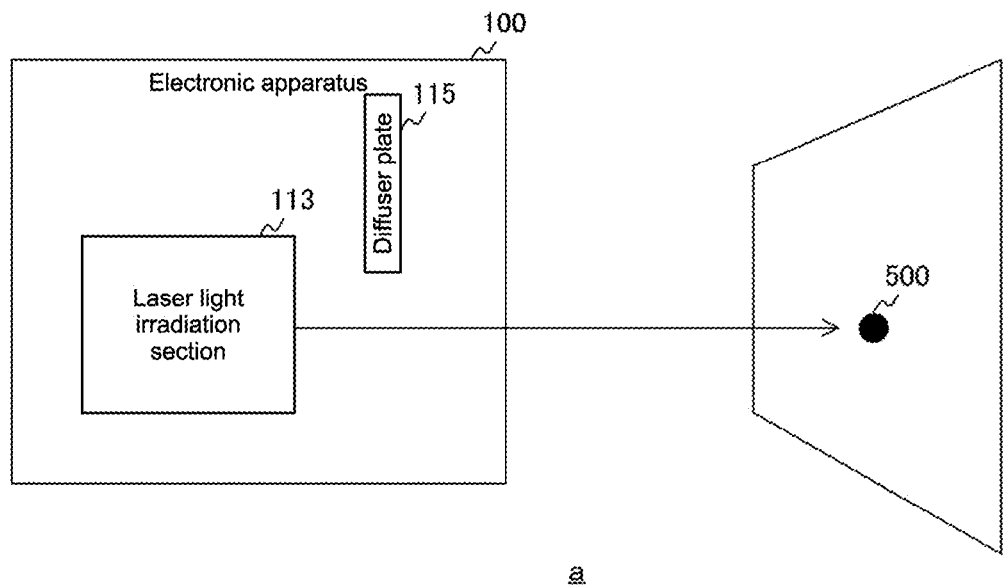
FIG. 9 is a diagram showing an example of the shape of laser light in the first embodiment of the present technology.
Figure 9:
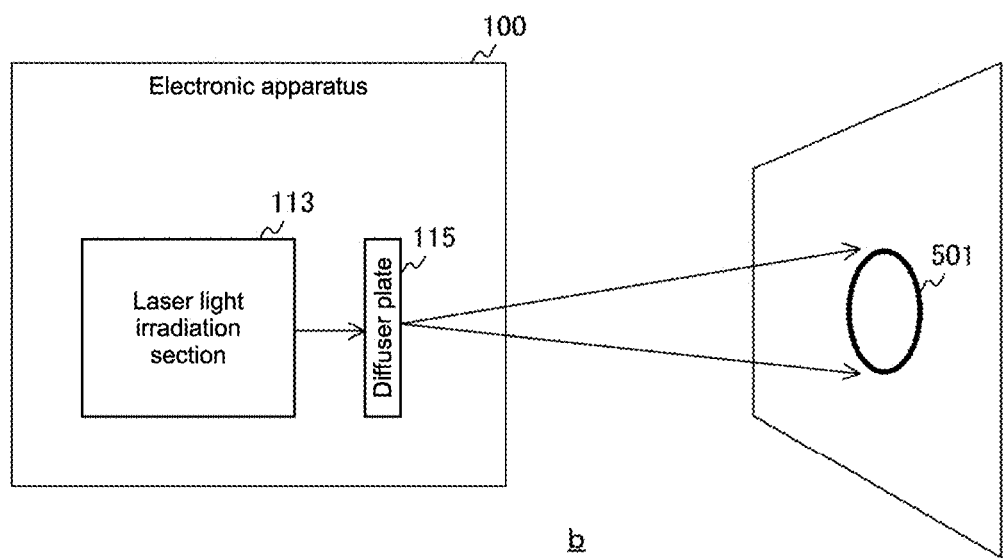

FIG. 9 is a diagram showing an example of the shape of the laser light in the first embodiment. Part a of the figure is a diagram showing an example of the shape of the laser light when the button is pressed halfway down. As exemplified in part a of the figure, when the button is pressed halfway down, spot-like laser light 500 is applied with the diffuser plate 115 being removed.

Further, part b of FIG. 9 is a diagram showing an example of the shape of the laser light when the button is pressed all the way down. As exemplified in part b of the figure, when the button is pressed all the way down, the diffuser plate 115 is inserted and circular laser light 501 is applied. A user adjusts a position irradiated with the laser light such that characters to be subjected to OCR (characters etc. on a price tag) fall within the circle of the laser light.

It should be noted that, in the ToF method, surface irradiation in which the entire surface to be subjected to distance measurement is irradiated with laser light is generally performed. However, if distance measurement is performed on only a part to be subjected to OCR, the electronic apparatus 100 does not need to irradiate the entire surface with the laser light, and it suffices that only such a part is irradiated with the laser light. When a range of irradiation with the laser light is narrowed, power consumption of the electronic apparatus 100 can be suppressed more than when the entire surface is irradiated with the laser light.

Further, in the ToF method, it is general to perform irradiation with light that is not visible light, such as infrared light. However, in assumed usage scenes of the electronic apparatus 100, the user needs to visually recognize a position irradiated with laser light. Thus, the electronic apparatus 100 performs irradiation with visible light such as red light. Also in a case where the visible light is used, the principle of the distance measurement by the ToF is similar to that in the case of infrared light.

Figure 10:
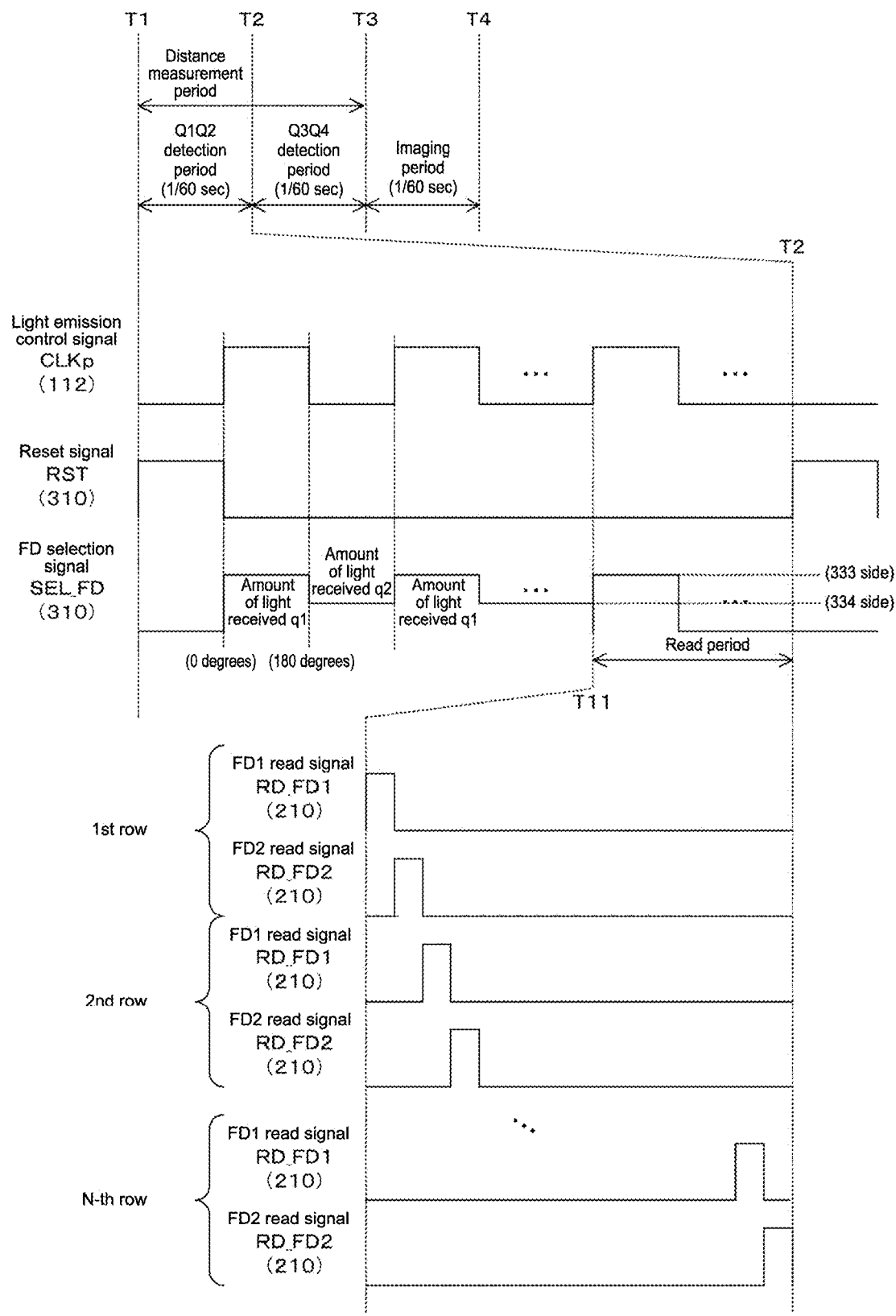
FIG. 10 is a timing chart showing an example of exposure control of a pixel circuit within a Q1Q2 detection period in the first embodiment of the present technology.

FIG. 10 is a timing chart showing an example of exposure control of the pixel circuit within a Q1Q2 detection period in the first embodiment. When the button is pressed all the way down, the pixel circuit 330 alternately repeats detection of the amounts of light received Q1 and Q2 and detection of the amounts of light received Q3 and Q4. Hereinafter, a detection period of the amounts of light received Q1 and Q2 is referred to as a "Q1Q2 detection period", and a detection period of the amounts of light received Q3 and Q4 is referred to as a "Q3Q4 detection period". The length of each of the Q1Q2 detection period and the Q3Q4 detection period is a cycle of a vertical synchronization signal VSYNC (e.g., 1/60 sec).

Here, the amount of light received Q1 is accumulation of the amounts of light received q1 from 0 degrees to 180 degrees over the Q1Q2 detection period, when a particular phase (e.g., rising) of a light emission control signal CLKp of the laser light is set to 0 degrees. The frequency of the light emission control signal CLKp is as high as 20 megahertz (MHz), and thus the amount of light received q1 per cycle (1/20 microsec) is very small and difficult to detect. Because of this, the pixel circuit 330 accumulates each q1 over the Q1Q2 detection period such as 1/60 sec, which is longer than the cycle of the light emission control signal CLKp (1/20 microsec), and detects the total amounts thereof as the amount of light received Q1. Further, the amount of light received Q2 is accumulation of the amounts of reflected light received q2 from 180 degrees to 360 degrees over the Q1Q2 detection period.

Further, the amount of light received Q3 is accumulation of the amounts of reflected light received q3 from 90 degrees to 270 degrees over the Q3Q4 detection period. Further, the amount of light received Q4 is accumulation of the amounts of reflected light received q4 from 270 degrees to 90 degrees over the Q3Q4 detection period.

Those amounts of light received Q1, Q2, Q3, and Q4 are substituted into the following expression, and thus the distance measurement section 116 can calculate a distance d to the measurement point. A method of deriving the expression is described in, for example, Larry Li, "Time-of-Flight Camera—An Introduction", Texas Instruments Incorporated, Technical White Paper SLOA190B January 2014 Revised May 2014.

$$d=(c/4\pi f)*\tan^{-1}\{(Q3-Q4)/(Q1-Q2)\}$$

In the above expression, d represents a distance, and its unit is meter (m), for example. c represents a light speed, and its unit is meter per second (m/s), for example. $\tan^{-1}(\ )$ represents an inverse function of a tangent function.

For example, in the Q1Q2 detection period from a timing T1 to a timing T2, the amounts of light received Q1 and Q2 in that period are detected. First, the row scanning circuit 310 supplies a reset signal RST to all the rows over a predetermined pulse period from the timing T1. By the reset signal RST, the amounts of charge stored in the charge storage sections 333 and 334 in all the rows are initialized. Further, the row scanning circuit 310 initializes the charge of the light-receiving elements 331 in all the rows with use of an FD selection signal SEL_FD.

The row scanning circuit 310 then causes charge generated by the light-receiving element 331 with use of the FD selection signal SEL_FD to be transferred to the charge storage section 333 for all the rows from 0 degrees to 180 degrees within the cycle of the light emission control signal CLKp in the Q1Q2 detection period. With this control, the amount of light received q1 is stored in the charge storage sections 333.

Further, the row scanning circuit 310 causes charge generated by the light-receiving element 331 with use of the FD selection signal SEL_FD to be transferred to the charge storage section 334 for all the rows from 180 degrees to 360 degrees within the cycle of the light emission control signal CLKp in the Q1Q2 detection period. With this control, the amount of light received q2 is stored in the charge storage section 334.

At a timing T11 immediately before the timing T2, the row scanning circuit 310 supplies in sequence the FD read signals RD_FD1 and RD_FD2 to the first row. With this control, a pixel signal corresponding to the amounts of light received Q1 and Q2 of the first row is read. Next, the row scanning circuit 310 supplies in sequence the FD read signals RD_FD1 and RD_FD2 to the second row and reads a pixel signal. Hereinafter, similarly, the row scanning circuit 310 selects the rows in sequence and reads pixel signals.

In such a manner, in the Q1Q2 detection period, each of the pixel circuits 330 detects the amount of light received Q1 from 0 degrees to 180 degrees and the amount of light received Q2 from 180 degrees to 360 degrees.

Figure 11:
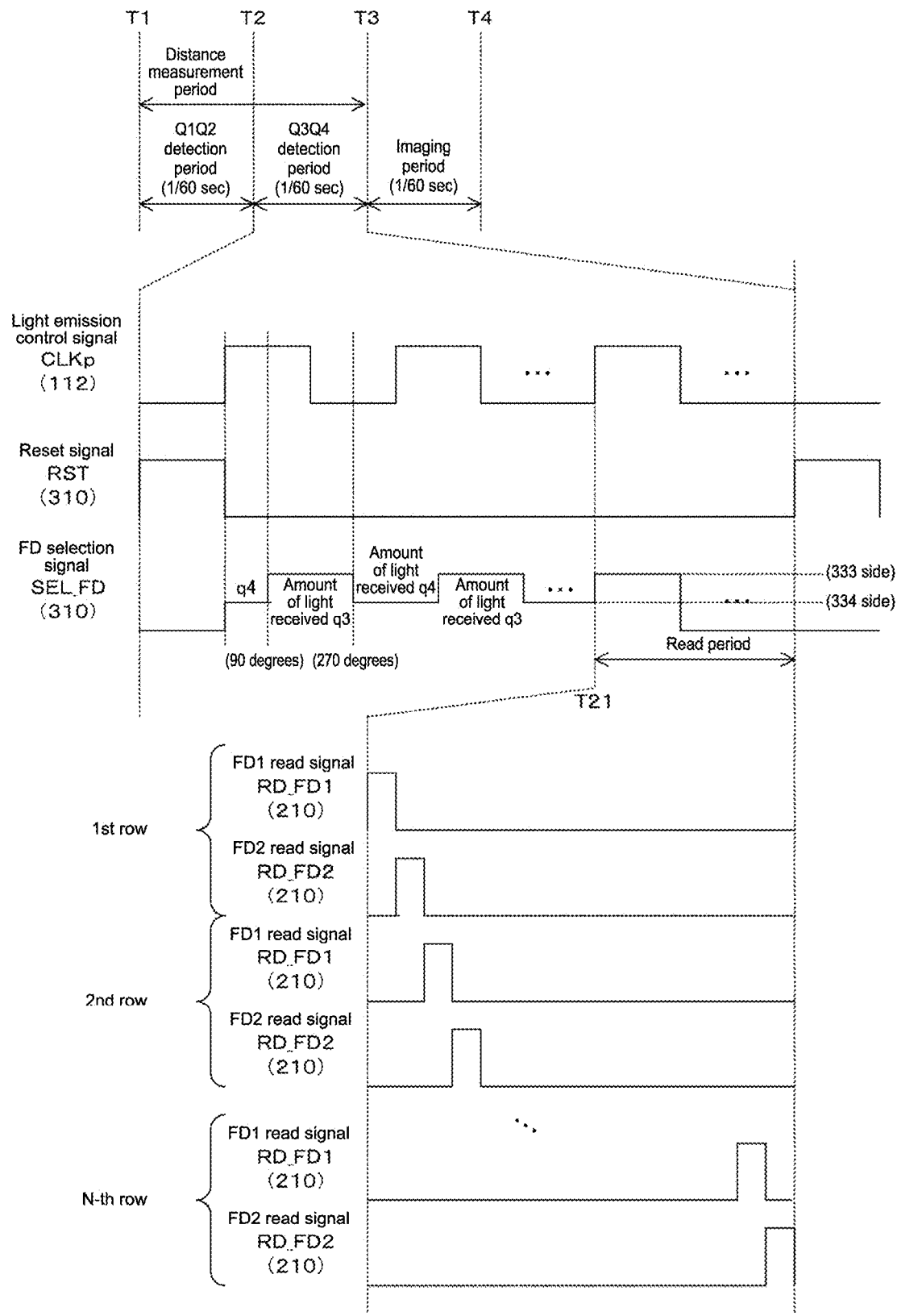
FIG. 11 is a timing chart showing an example of the exposure control of the pixel circuit within a Q3Q4 detection period in the first embodiment of the present technology.

FIG. 11 is a timing chart showing an example of exposure control of the pixel circuits 330 within the Q3Q4 detection period in the first embodiment. For example, in the Q3Q4 detection period from the timing T2 to a timing T3, the amounts of light received Q3 and Q4 of that period are detected. First, the row scanning circuit 310 supplies the reset signal RST to all the rows over a predetermined pulse period from the timing T2 and initializes the amounts of charge stored in the charge storage sections 333 and 334 in all the rows. Further, the row scanning circuit 310 initializes the charge of the light-receiving elements 331 in all the rows with use of the FD selection signal SEL_FD.

The row scanning circuit 310 then causes charge generated by the light-receiving element 331 with use of the FD selection signal SEL_FD to be transferred to the charge storage section 334 for all the rows from the initial 0 degrees to 90 degrees. With this control, the amount of light received q4 is stored in the charge storage section 334. Hereinafter, the row scanning circuit 310 causes charge generated by the light-receiving element 331 with use of the FD selection signal SEL_FD to be transferred to the charge storage section 333 for all the rows from 90 degrees to 270 degrees within the cycle of the light emission control signal CLKp. With this control, the amount of light received q3 is stored in the charge storage section 333.

Further, the row scanning circuit 310 causes charge generated by the light-receiving element 331 with use of the FD selection signal SEL_FD to be transferred to the charge storage section 334 for all the rows from 270 degrees to 90 degrees within the cycle of the light emission control signal CLKp in the Q3Q4 detection period. With this control, the amount of light received q4 is stored in the charge storage section 334.

At a timing T21 immediately before the timing T3, the row scanning circuit 310 supplies in sequence the FD read signals RD_FD1 and RD_FD2 to the first row. With this control, a pixel signal corresponding to the amounts of light received Q3 and Q4 of the first row is read. Hereinafter, similarly, the row scanning circuit 310 selects the rows in sequence and reads pixel signals.

In such a manner, in the Q3Q4 detection period, each of the pixel circuits 330 detects the amount of light received Q3 from 90 degrees to 270 degrees and the amount of light received Q4 from 270 degrees to 90 degrees.

Figure 12:
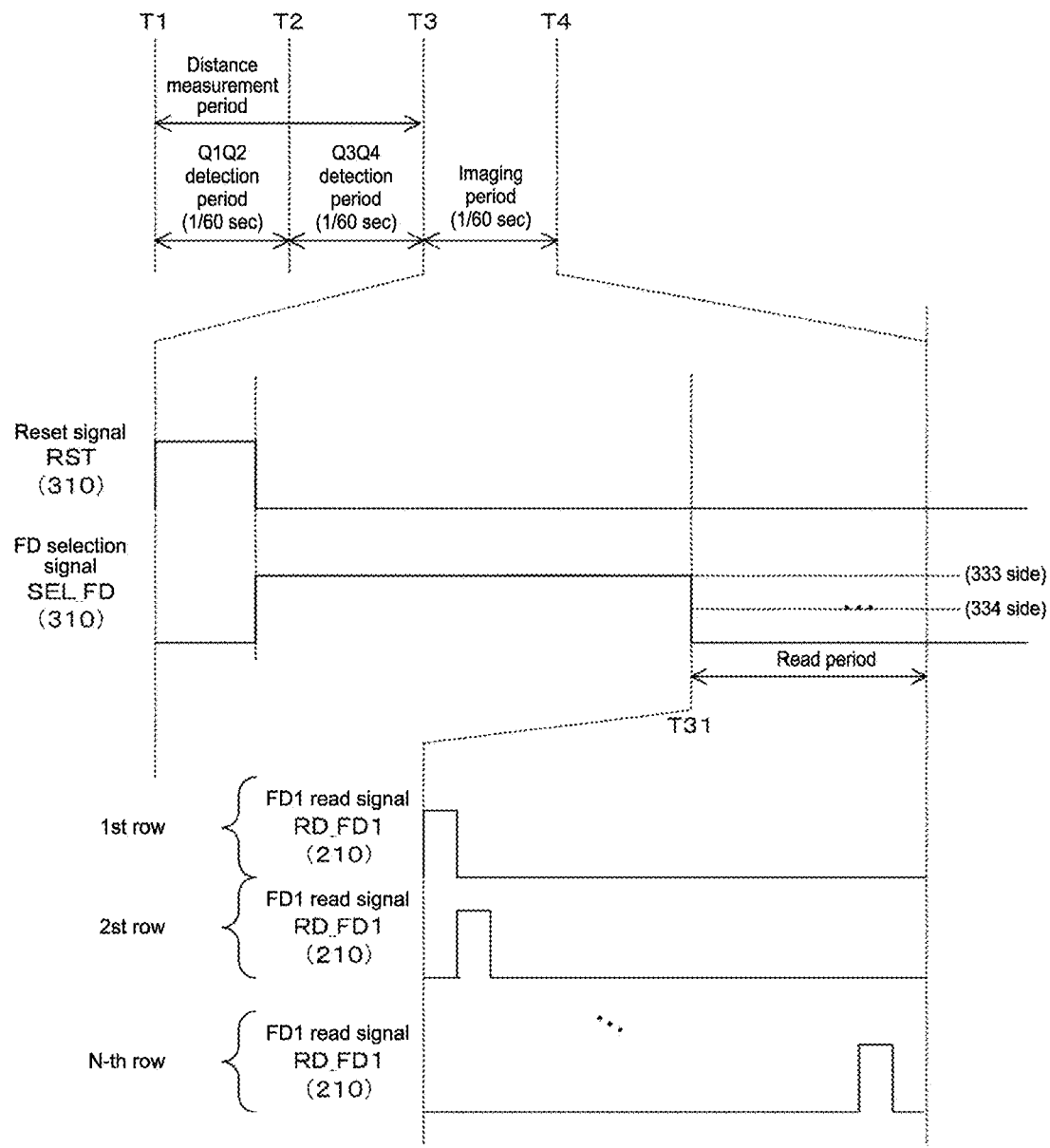
FIG. 12 is a timing chart showing an example of the exposure control of the pixel circuit within an imaging period in the first embodiment of the present technology.

FIG. 12 is a timing chart showing an example of exposure control of the pixel circuits 330 within an imaging period in the first embodiment. First, the row scanning circuit 310 supplies the reset signal RST to all the rows over a predetermined pulse period from the timing T3 and initializes the amount of charge stored in all the rows. Further, the row scanning circuit 310 initializes the charge of the light-receiving elements 331 in all the rows with use of the FD selection signal SEL_FD.

The row scanning circuit 310 then causes charge generated by the light-receiving element 331 with use of the FD selection signal SEL_FD to be transferred to the charge storage section 333 for all the rows. Subsequently, at a timing T31 immediately before a timing T4, the row scanning circuit 310 supplies the FD read signal RD_FD1 to the first row and reads a pixel signal. Next, the row scanning circuit 310 supplies the FD read signal RD_FD1 to the second row and reads a pixel signal. Hereinafter, similarly, the row scanning circuit 310 selects the rows in sequence and reads pixel signals. As a result, image data is captured.

Figure 13:
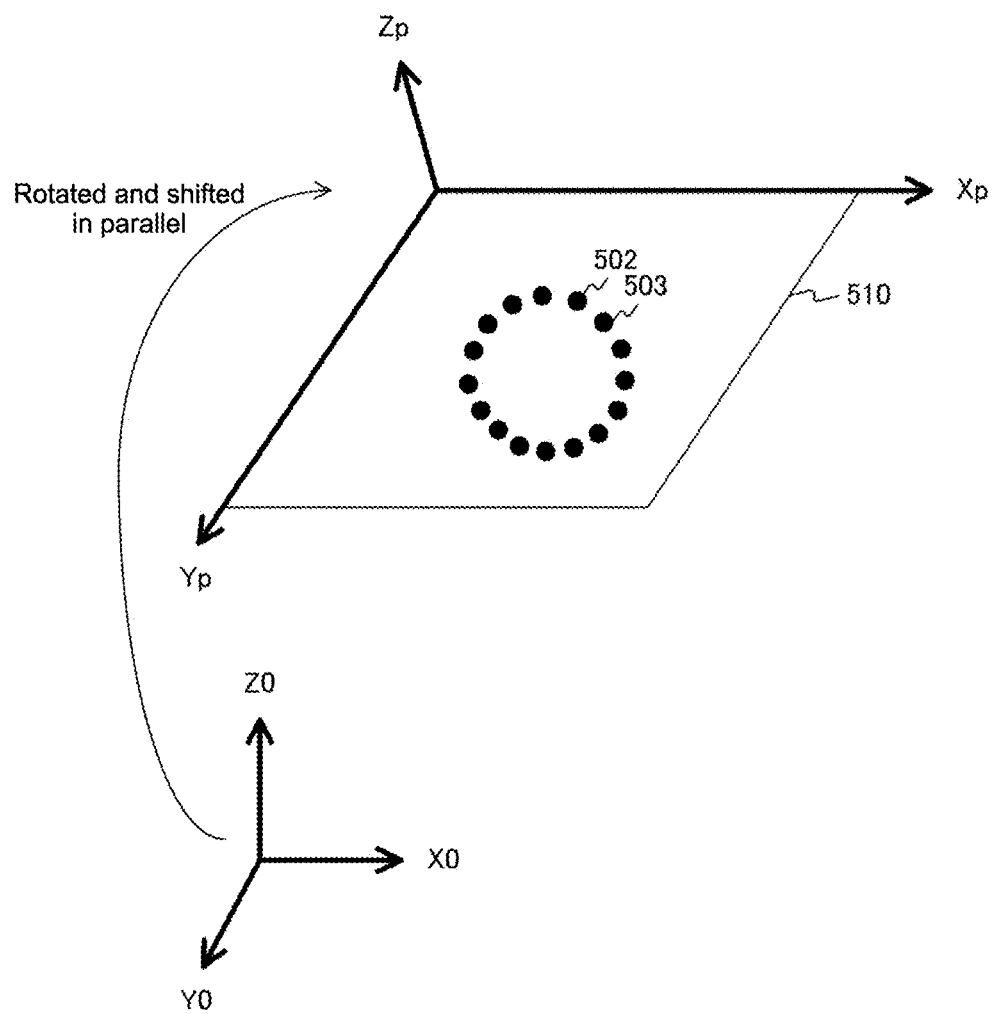
FIG. 13 is a diagram showing an example of a relationship between a reference coordinate system and a planar coordinate system in the first embodiment of the present technology.

FIG. 13 is a diagram showing an example of the relationship between the reference coordinate system and the planar coordinate system in the first embodiment. As described above, it is assumed that the reference coordinate system including the $X_0$ axis, the $Y_0$ axis, and the $Z_0$ axis is rotated and shifted in parallel by Rp and Tp, and the planar coordinate system including the Xp axis, the Yp axis, and the Zp axis is obtained. On the basis of this assumption, the electronic apparatus 100 calculates the sum of the squared errors Ep, assuming that N measurement points such as measurement points 502 and 503 are positioned on an Xp-Yp plane 510.

Figure 14:
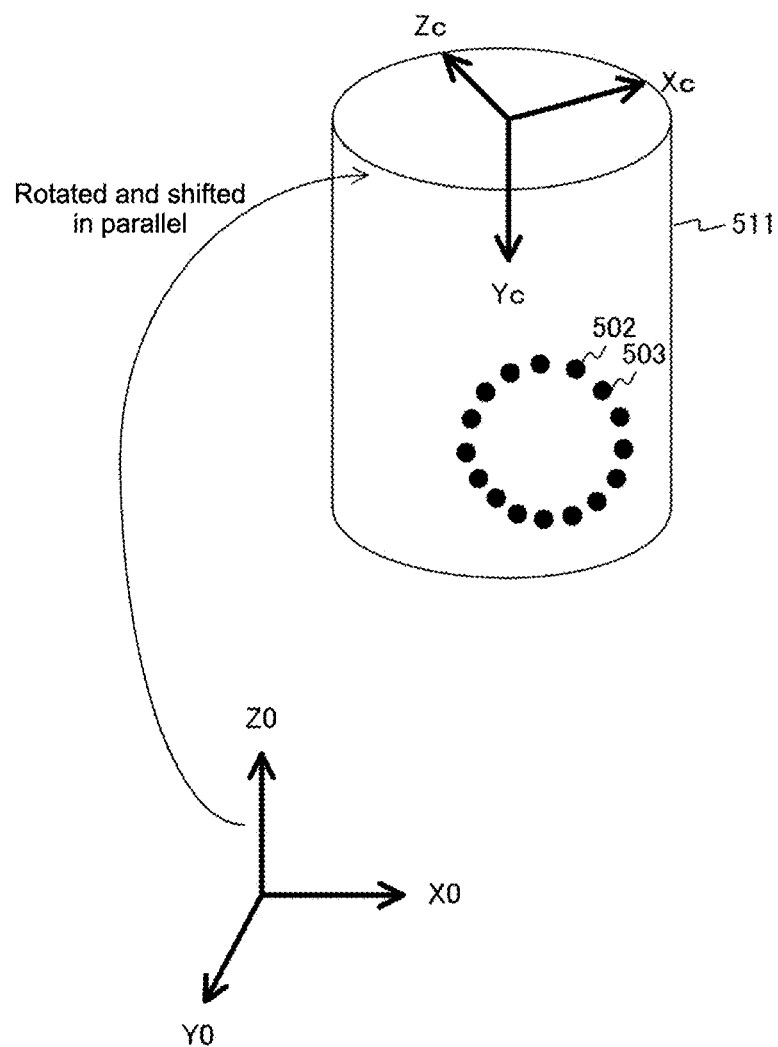
FIG. 14 is a diagram showing an example of a relationship between the reference coordinate system and a columnar coordinate system in the first embodiment of the present technology.

FIG. 14 is a diagram showing an example of the relationship between the reference coordinate system and the columnar coordinate system in the first embodiment. As described above, it is assumed that the reference coordinate system including the $X_0$ axis, the $Y_0$ axis, and the $Z_0$ axis is rotated and shifted in parallel by Rc and Tc, and the columnar coordinate system including the Xc axis, the Yc axis, and the Zc axis is obtained. On the basis of this assumption, the electronic apparatus 100 calculates the error Ec, assuming that N measurement points such as measurement points 502 and 503 are positioned on the surface of a column 511.

Figure 15:
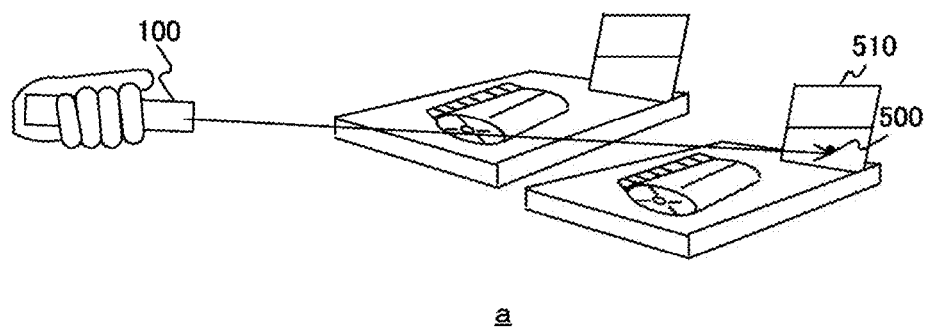
FIG. 15 is a diagram showing an example of a usage scene of the electronic apparatus when an inclined plane is imaged in the first embodiment of the present technology.
Figure 15:
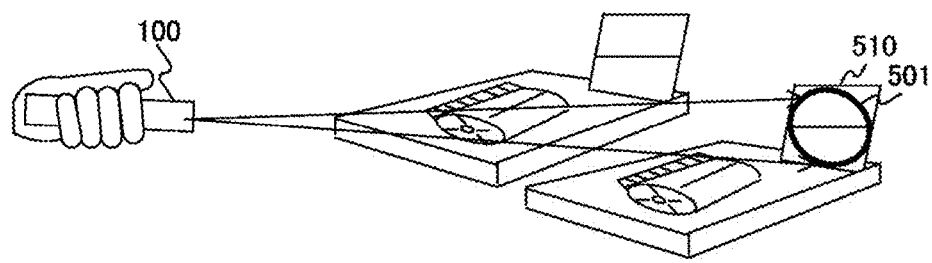

FIG. 15 is a diagram showing an example of a usage scene of the electronic apparatus 100 when an inclined plane is imaged in the first embodiment. Part a of the figure is a diagram showing an example of the shape of the laser light when the button is pressed halfway down. As exemplified in part a of the figure, when the button is pressed halfway down, the spot-like laser light 500 is applied. Here, the electronic apparatus 100 is, for example, a stick-like apparatus. A user grasps the electronic apparatus 100 with the hand and can change the direction of the laser light. The user moves a point irradiated with the laser light 500 and presses the button all the way down at a position of characters to be subjected to OCR. For example, when a fillet of fish is provided with a planar price tag, and characters of the price tag are read by OCR, a user moves the point irradiated with the laser light 500 to that price tag. The plane of the price tag corresponds to the plane 510 of FIG. 13.

Part b of FIG. 15 is a diagram showing an example of the shape of the laser light when the button is pressed all the way down. As exemplified in part b of the figure, when the button is pressed all the way down, the circular laser light 501 is applied to the price tag (plane 510).

Figure 16:
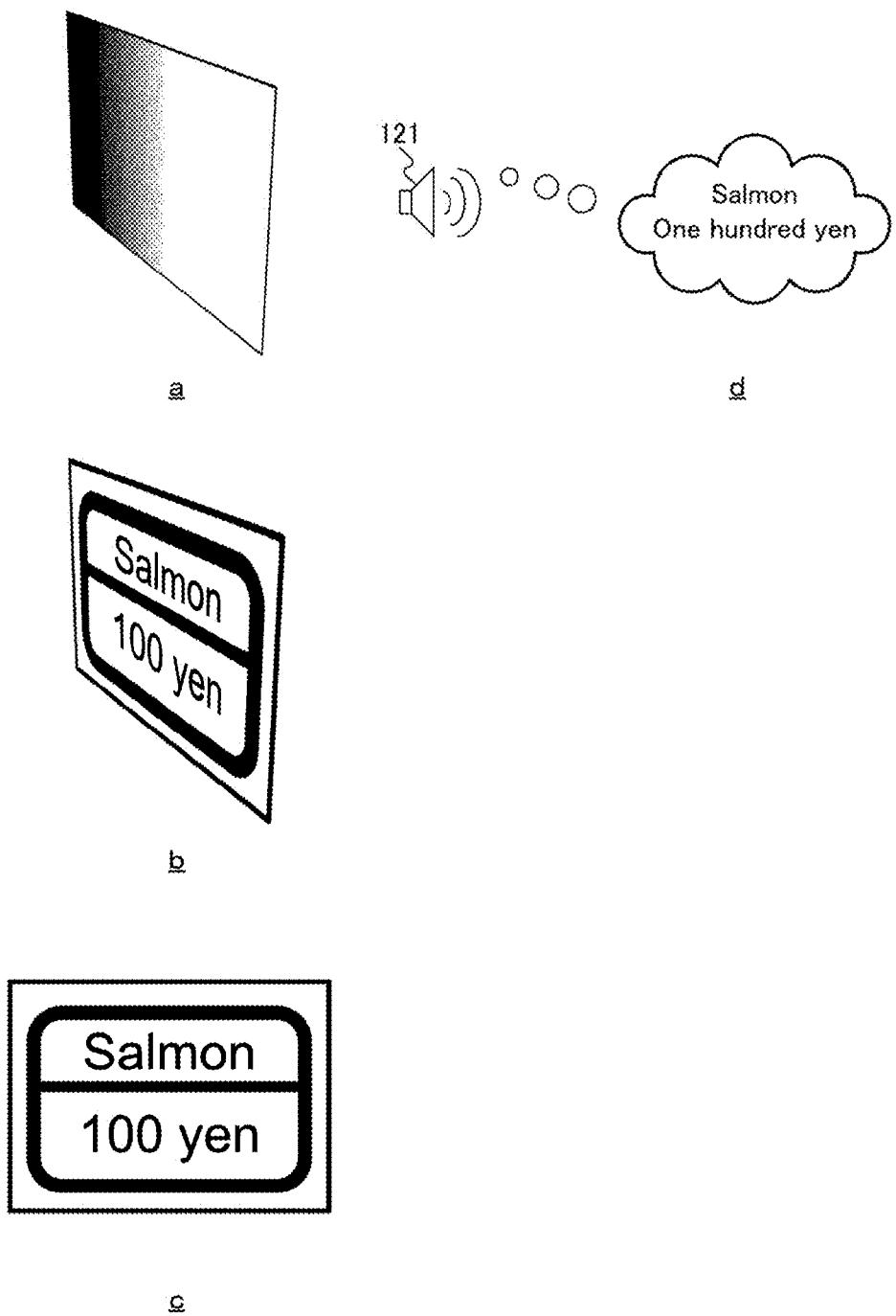
FIG. 16 is a diagram showing an example of a planar shape, images before and after conversion, and a result of translation in the first embodiment of the present technology.

FIG. 16 is a diagram showing an example of a planar shape, images before and after conversion, and a result of translation in the first embodiment. Part a of the figure is a diagram showing an example of a candidate planar shape. The color gradation represents a depth. For example, a plane inclined to the image plane of the imaging device 300 is assumed.

Part b of FIG. 16 shows an example of a part irradiated with the laser light in the captured image data. Although character strings of "Salmon" and "100 yen" are described in the price tag, characters are distorted because the plane of the price tag does not face the image plane. Because of this, there is a risk that the characters cannot be accurately read by OCR at this rate.

In this regard, the electronic apparatus 100 converts the coordinates on the inclined plane into the coordinates on the reference plane. Part c of FIG. 16 is an example of an image after the coordinate conversion. As exemplified in part c of the figure, the plane that does not face the image plane is converted into the reference plane facing thereto, and the distortion of the characters disappears. The electronic apparatus 100 reads the characters in the converted image by OCR and performs translation.

Part d of FIG. 16 is a diagram showing an example of a result of the translation. "Salmon" and "100 yen" in Japanese are translated into "Salmon" and "One hundred yen" in English and are output by sound.

Figure 17:
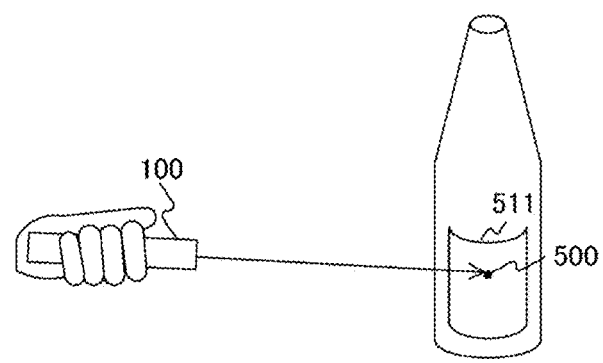
FIG. 17 is a diagram showing an example of a usage scene of the electronic apparatus when a column is imaged in the first embodiment of the present technology.
Figure 17:
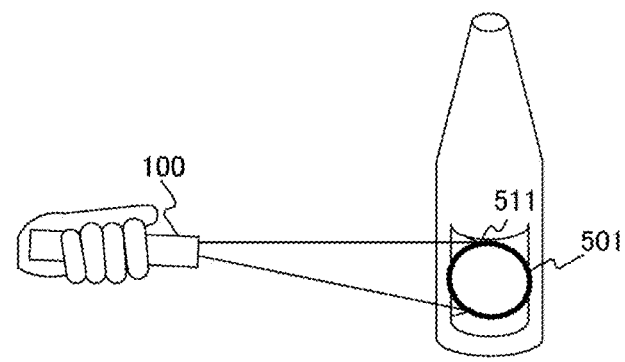

FIG. 17 is a diagram showing an example of a usage scene of the electronic apparatus 100 when an object with a columnar shape is imaged in the first embodiment. Part a in the figure is a diagram showing an example of the shape of the laser light when the button is pressed halfway down. For example, in a case where a label is attached to a columnar part of a wine bottle, and characters of the label are intended to be read by OCR, a user moves a point irradiated with the laser light 500 to that label. This columnar part of the wine bottle corresponds to the column 511 of FIG. 14.

Part b of FIG. 17 is a diagram showing an example of the shape of the laser light when the button is pressed all the way down. As exemplified in part b of the figure, when the button is pressed all the way down, the circular laser light 501 is applied to the label (column 511).

Figure 18:
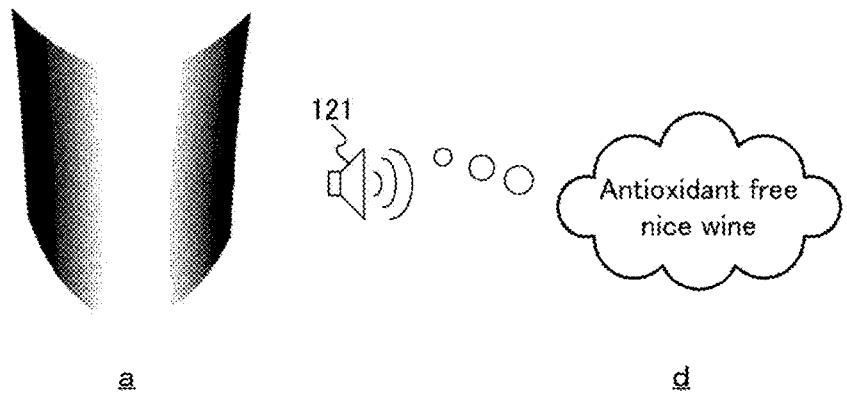
FIG. 18 is a diagram showing an example of a columnar shape, images before and after conversion, and a result of translation in the first embodiment of the present technology.
Figure 18:

FIG. 18 is a diagram showing an example of a columnar shape, images before and after conversion, and a result of translation in the first embodiment. Parts a and b of the figure are each a diagram showing an example of a candidate columnar shape.

Part b of FIG. 18 shows an example of a part irradiated with the laser light in the captured image data. Although character strings of "Antioxidant free nice wine" are described in the label, characters are distorted because the surface of the label is curved. Because of this, there is a risk that the characters cannot be accurately read by OCR at this rate.

In this regard, the electronic apparatus 100 converts the coordinates on the column into the coordinates on the reference plane. Part c of FIG. 18 is an example of an image after the coordinate conversion. As exemplified in part c of the figure, the curved surface of the column is converted into the reference plane, and the distortion of the characters disappears. The electronic apparatus 100 reads the characters in the converted image by OCR and performs translation.

Part d of FIG. 18 is a diagram showing an example of a result of the translation. "Antioxidant free nice wine" in Japanese is translated into "Antioxidant free nice wine" in English and output by sound.

[Operation Example of Electronic Apparatus]

Figure 19:
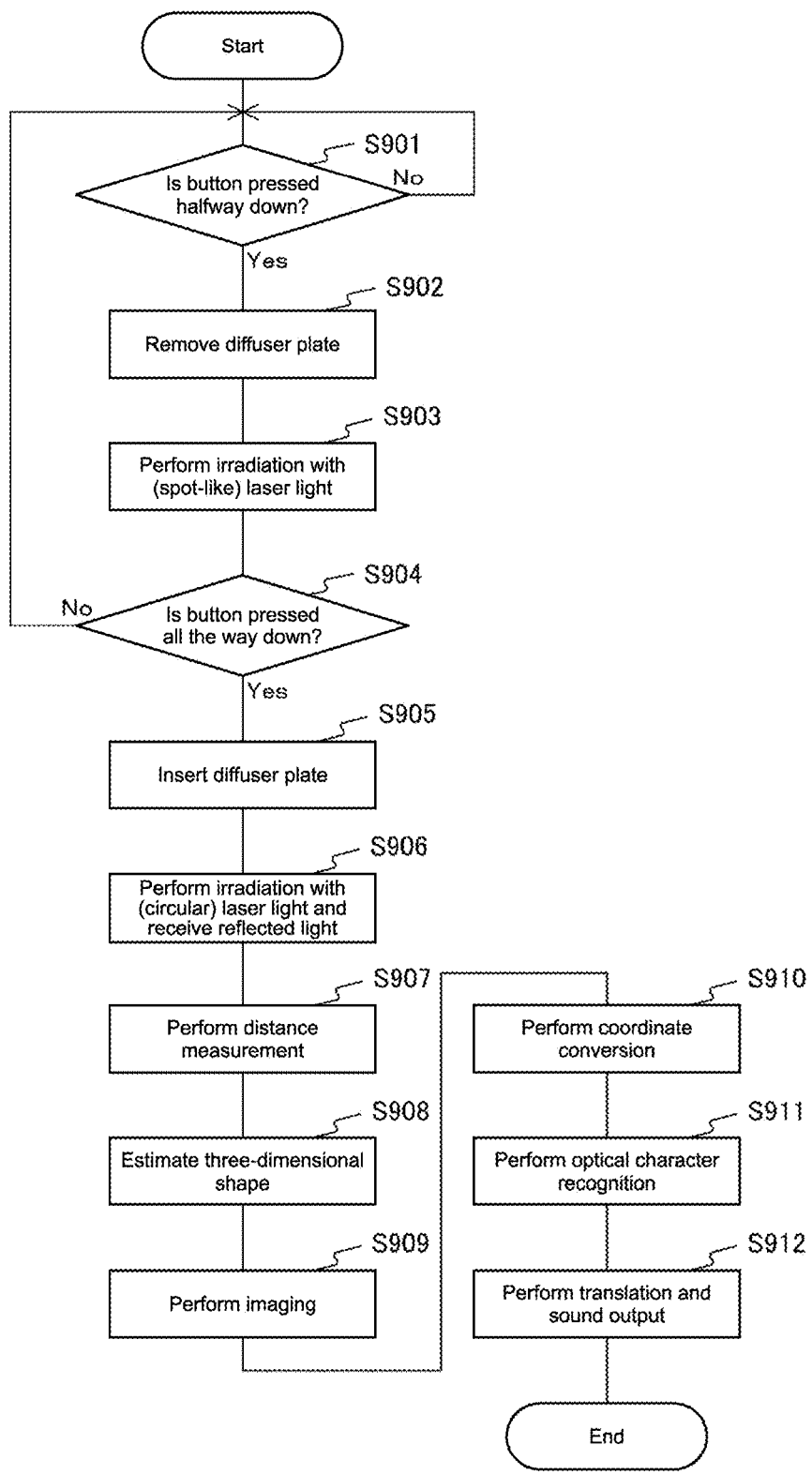
FIG. 19 is a flowchart showing an example of the operation of the electronic apparatus in the first embodiment of the present technology.

FIG. 19 is a flowchart showing an example of the operation of the electronic apparatus 100 in the first embodiment. This operation starts, for example, when the electronic apparatus 100 is powered on. The electronic apparatus 100 determines whether the button is pressed halfway down by the user (Step S901). When the button is pressed halfway down (Step S901: Yes), the electronic apparatus 100 removes the diffuser plate (Step S902) and performs irradiation with spot-like laser light (Step S903). The electronic apparatus 100 then determines whether the button is pressed all the way down by the user (Step S904).

When the button is not pressed halfway down (Step S901: No) or when the button is not pressed all the way down (Step S904: No), the electronic apparatus 100 repeats Step S901 and the subsequent steps.

When the button is pressed all the way down (Step S904: Yes), the electronic apparatus 100 inserts the diffuser plate (Step S905) and performs irradiation with circular laser light and reception of its reflected light (Step S906). The electronic apparatus 100 performs distance measurement for each of the measurement points by the ToF method (Step S907) and estimates a three-dimensional shape of the object on the basis of the measured distances (Step S908).

The electronic apparatus 100 then images the object (Step S909) and performs coordinate conversion on the image data (Step S910). The electronic apparatus 100 performs optical character recognition on the image after subjected to the coordinate conversion (Step S911) and performs translation and sound output (Step S912). After Step S912, the electronic apparatus 100 terminates the operation for OCR.

In such a manner, according to the first embodiment of the present technology, the electronic apparatus 100 estimates the shape of the object on the basis of the distances to the measurement points and performs coordinate conversion on the basis of that shape. Thus, it is possible to eliminate the distortion of the characters and increase the accuracy of the OCR.

[Modified Example]

In the first embodiment described above, the stick-like electronic apparatus 100 includes the operation section 111, the imaging device 300, and the like. However, the operation section 111 and the like may be provided to a camera unit mounted to a wearable terminal. An imaging system in this modified example of the first embodiment is different from the first embodiment in that the operation section 111 and the like are provided to a camera unit mounted to a wearable terminal.

Figure 20:
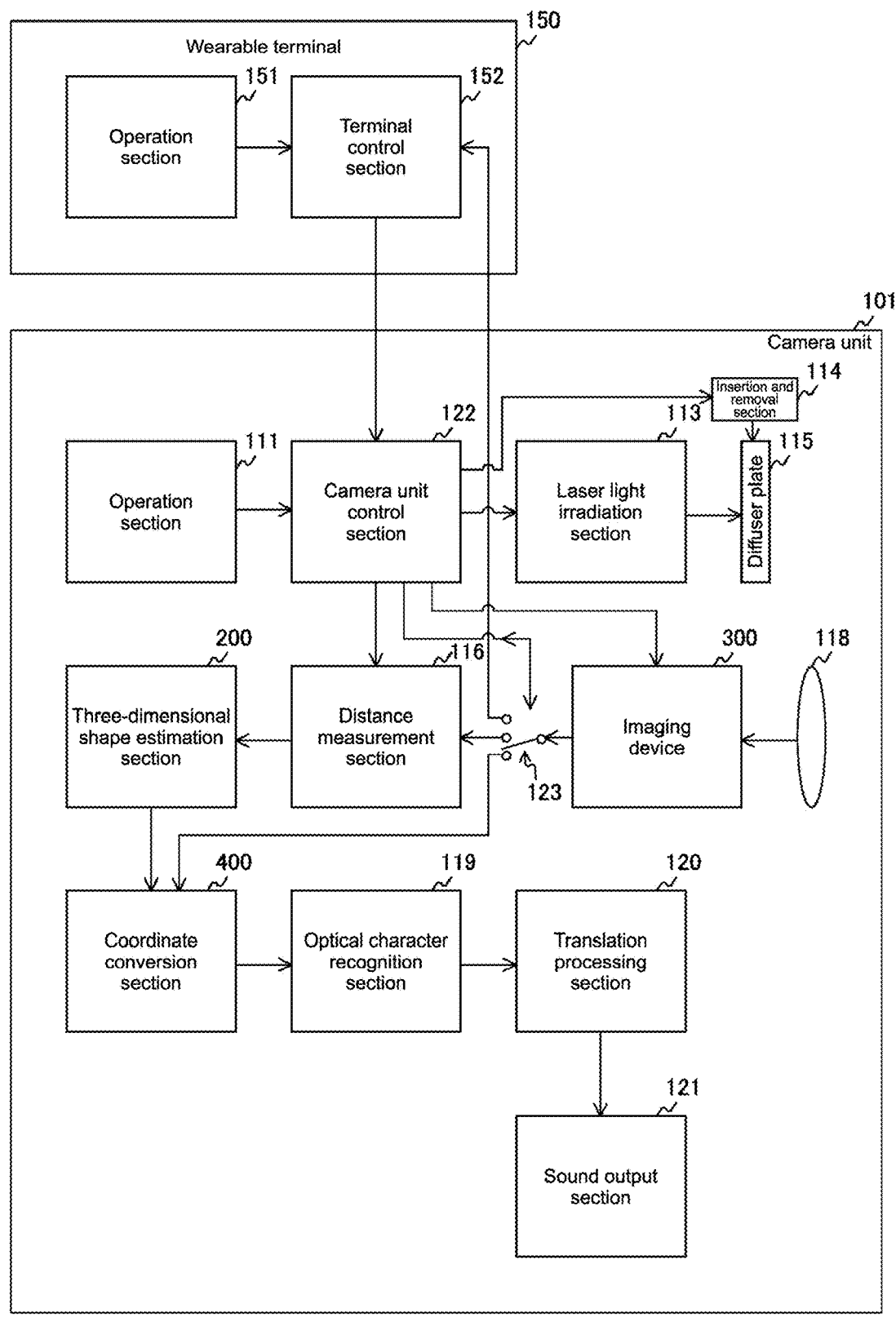
FIG. 20 is a block diagram showing a configuration example of an imaging system in a modified example of the first embodiment of the present technology.

FIG. 20 is a block diagram showing a configuration example of an imaging system. The imaging system includes a wearable terminal 150 and a camera unit 101. Further, the wearable terminal 150 includes an operation section 151 and a terminal control section 152. Further, a configuration of the camera unit 101 is similar to that of the electronic apparatus 100 of the first embodiment except that the camera unit 101 includes a camera unit control section 122 and a switch 123 instead of the control section 112 and the switch 117. It should be noted that the camera unit 101 is an example of an electronic apparatus described in the Claims.

The operation section 151 generates an operation signal according to a user operation on a switch or a button. For example, an operation to capture image data (e.g., to press a shutter button down) is performed. The operation section 151 supplies the generated operation signal to the terminal control section 152.

The terminal control section 152 controls the entire wearable terminal 150. The terminal control section 152 supplies the operation signal to the camera unit control section 122 and receives image data and the like from the camera unit control section 122.

The camera unit control section 122 controls the entire camera unit 101. In a case where the camera unit 101 is not mounted to the wearable terminal 150, the camera unit control section 122 performs control similar to that in the first embodiment. Meanwhile, in a case where the camera unit 101 is mounted to the wearable terminal 150, the camera unit control section 122 determines whether the operation for capturing image data (e.g., for pressing a shutter button down) is performed. When the shutter button is pressed down, the camera unit control section 122 controls the switch 123 to output image data to the wearable terminal 150.

The switch 123 switches an output destination of the image data under the control of the camera unit control section 122.

Figure 21:
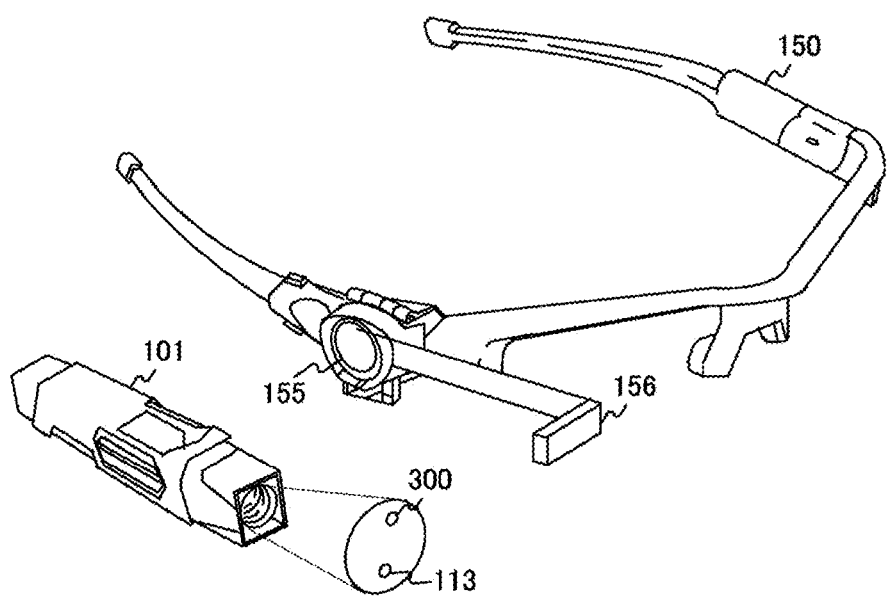
FIG. 21 is an example of an outer appearance view of the imaging system in the modified example of the first embodiment of the present technology.

FIG. 21 is an example of an outer appearance view of the imaging system in the modified example of the first embodiment. The wearable terminal 150 is an eyeglasses-type terminal. The camera unit 101 can be attached to the side surface of the wearable terminal 150 via a coupling tool 155. The lens portions of this terminal are omitted in the figure. For the coupling tool 155, for example, one described in FIG. 1 or 2 of Japanese Unexamined Patent Application Publication No. 2015-515638 can be used.

The camera unit 101 operates also when detached from the wearable terminal 150. The function of the single camera unit 101 is similar to that of the electronic apparatus 100 of the first embodiment.

Further, the wearable terminal 150 is provided with a blocking member 156. The blocking member 156 blocks laser light from the camera unit 101 when the camera unit 101 is attached. It should be noted that incident light to the imaging device 300 is not blocked.

For example, it is assumed that the laser light irradiation section 113 is disposed at the lower portion of the camera unit 101 and the imaging device 300 is disposed at the upper portion thereof. In this case, the blocking member 156 blocks only the lower portion of the camera unit 101. As a result, only the laser light is masked. The laser light is blocked in a situation where distance measurement is unnecessary, and thus it is possible to prevent the laser light from appearing in the captured image data. This makes it possible to increase convenience of the imaging system.

The camera unit 101 does not perform distance measurement but captures image data or the like when mounted to the wearable terminal 150. The wearable terminal 150 analyzes that image data and displays predetermined information on a head-up display of the terminal. For example, current position information, an image to be synthesized with a recognized object, and the like are displayed.

In such a manner, according to the modified example of the first embodiment of the present technology, the blocking member 156 blocks the laser light when the camera unit 101 is mounted to the wearable terminal 150. Thus, it is possible to prevent the laser light from appearing in the captured image data.

<2. Second Embodiment>

Although the first embodiment described above performs the distance measurement by the ToF method, the ToF method needs components to perform irradiation with laser light, and this makes it difficult to reduce costs and size accordingly. An electronic apparatus 100 of this second embodiment is different from that of the first embodiment in that reduction in size and costs is achieved.

Figure 22:
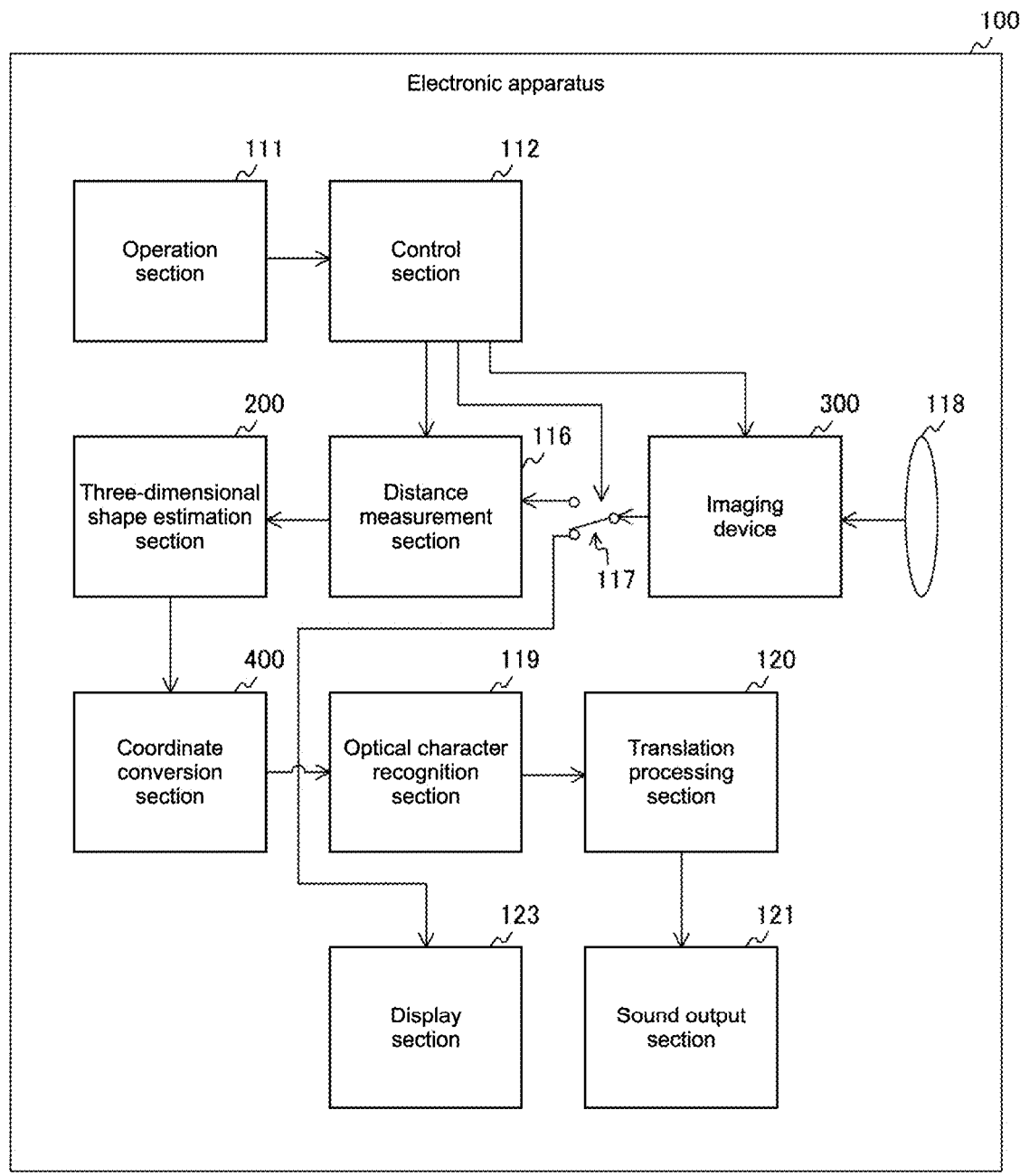
FIG. 22 is a block diagram showing a configuration example of an electronic apparatus in a second embodiment of the present technology.

FIG. 22 is a block diagram showing a configuration example of the electronic apparatus 100 in the second embodiment. For the electronic apparatus 100 of the second embodiment, a digital camera such as a digital single-lens reflex camera is assumed. Further, the electronic apparatus 100 of the second embodiment is different from that of the first embodiment in that a display section 123 is further provided instead of the laser light irradiation section 113.

Further, in an imaging device 300 of the second embodiment, phase difference detection pixels that detect a phase difference of a pair of images pupil-split, and normal pixels are disposed.

When a button such as a shutter button is pressed halfway down, a control section 112 controls the imaging device 300 to capture an image with a relatively low resolution as a live-view image in synchronization with a vertical synchronization signal. The control section 112 then controls a switch 117 to supply the live-view image to the display section 123.

Further, when the button is pressed all the way down, the control section 112 causes the imaging device 300 to capture image data with a higher resolution than that of the live-view image. The control section 112 then controls the switch 117 to supply the image data to a distance measurement section 116.

The display section 123 displays the image data. The display section 123 is achieved by, for example, a liquid crystal monitor.

The distance measurement section 116 measures a distance on the basis of the pixel signals of the phase difference pixels and supplies the image data and distance information to a three-dimensional shape estimation section 200. In this image data, pixel values of positions of the phase difference pixels are interpolated from surrounding pixels. Processing of a coordinate conversion section 400 and the others are similar to those of the first embodiment.

It should be noted that the electronic apparatus 100 uses the distance measurement information in order to estimate a three-dimensional shape, but the distance measurement information is also used for AF (Auto Focus). In FIG. 22, an AF control section that controls a position of a focus lens on the basis of the distance measurement information is omitted.

Figure 23:
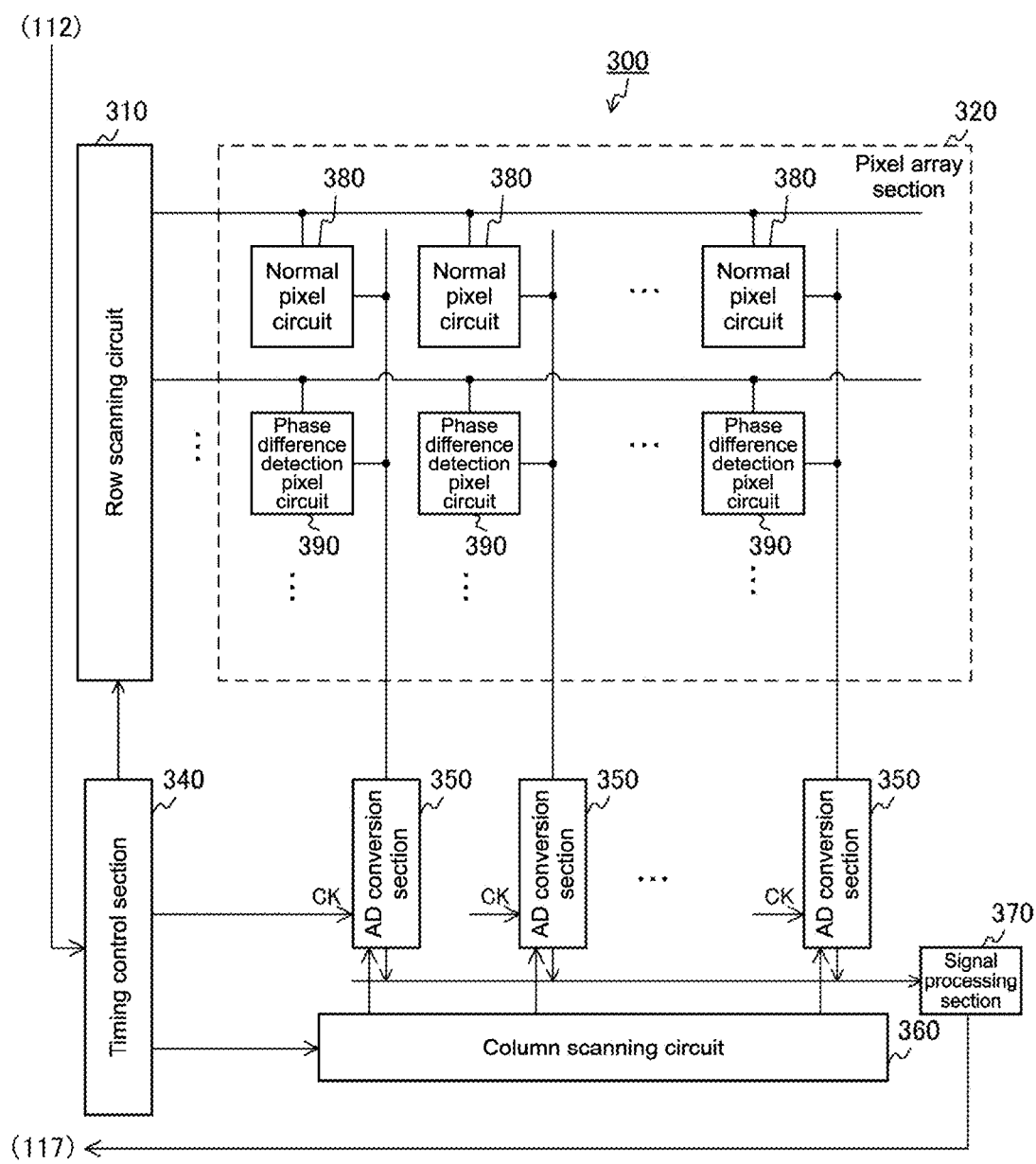
FIG. 23 is a block diagram showing a configuration example of an imaging device in the second embodiment of the present technology.

FIG. 23 is a block diagram showing a configuration example of the imaging device 300 in the second embodiment. The imaging device 300 of the second embodiment is different from that of the first embodiment in that normal pixel circuits 380 and phase difference detection pixel circuits 390 are provided instead of the pixel circuits 330.

The normal pixel circuits 380 are pixels that perform photoelectric conversion on visible light such as R (Red), G (Green), and B (Blue) and generate pixel signals. The phase difference detection pixel circuits 390 are pixels for detecting a phase difference of a pair of images pupil-split. In such a manner, a method in which the pixels for phase difference detection are disposed on the image plane, and a distance is measured on the basis of the signals of those pixels is referred to as an image-plane phase difference method. The structure of the imaging device 300 in such an image-plane phase difference method is described in, for example, Japanese Patent Application Laid-open No. 2012-124791.

Figure 24:
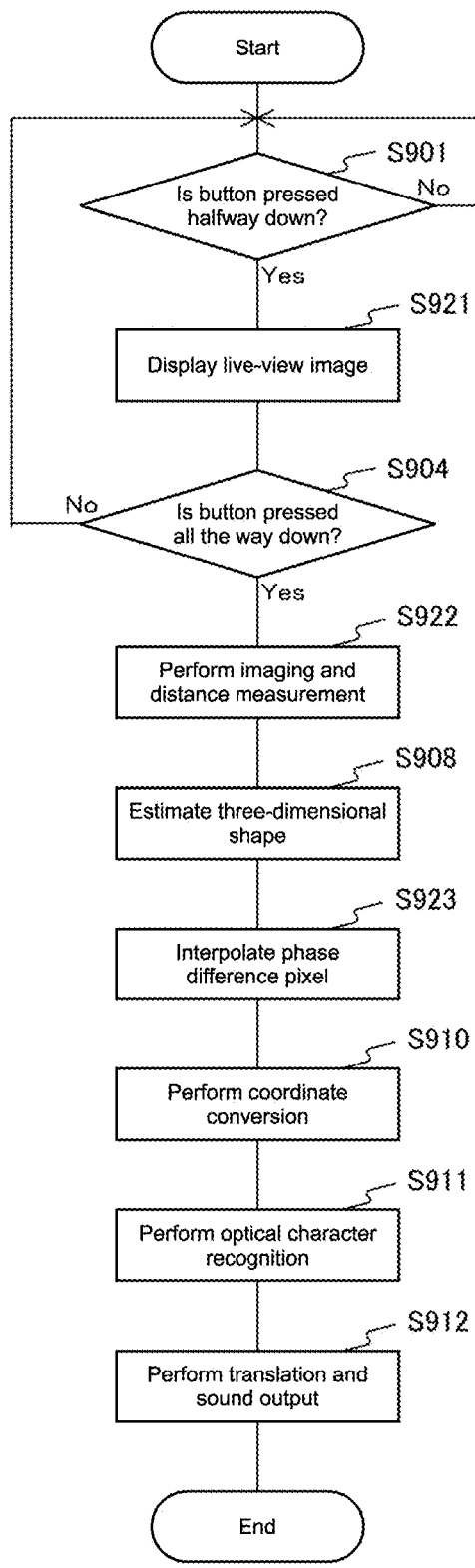
FIG. 24 is a flowchart showing an example of the operation of the electronic apparatus in the second embodiment of the present technology.

FIG. 24 is a flowchart showing an example of the operation of the electronic apparatus 100 in the second embodiment. The electronic apparatus 100 determines whether the button is pressed halfway down by the user (Step S901). When the button is pressed halfway down (Step S901: Yes), the electronic apparatus 100 captures and displays a live-view image (Step S921). The user adjusts the orientation of the electronic apparatus 100 while viewing the live-view image such that characters to be subjected to OCR fall within the monitor (display section 123). After the adjustment, the user presses the button all the way down.

The electronic apparatus 100 then determines whether the button is pressed all the way down by the user (Step S904). When the button is pressed all the way down, the electronic apparatus 100 captures image data and also obtains a distance for each of the measurement points on the basis of the phase difference detected in the phase difference detection pixel circuits 390 (Step S922). Further, the electronic apparatus 100 estimates a three-dimensional shape (Step S908) and interpolates the phase difference pixels in the image data (Step S923). The electronic apparatus 100 then executes Step S910 and subsequent steps.

In such a manner, according to the second embodiment of the present technology, since a distance is measured on the basis of the phase difference detected by the phase difference detection pixels, it is unnecessary to provide the laser light irradiation section 113 or the diffuser plate 115 and it is possible to reduce the number or components. This facilitates reduction in size or costs.

It should be noted that the embodiments described above are examples for embodying the present technology, and matters in the embodiments and matters specifying the invention in the Claims have respective correspondence relationships. Similarly, the matters specifying the invention in the Claims and matters in the embodiments of the present technology, which are denoted by names identical to the matters specifying the invention, have respective correspondence relationships. However, the present technology is not limited to the embodiments and can be embodied by variously modifying the embodiments without departing from the gist of the present technology.

Further, the processing steps described in the above embodiments may be understood as a method including a series of those steps. Alternatively, the processing steps described in the above embodiments may be understood as a program for causing a computer to execute the series of those steps or as a recording medium storing that program. As the recording medium, for example, a CD (Compact Disc), an MD (Mini Disc), a DVD (Digital Versatile Disc), a memory card, a Blu-ray® Disc, and the like can be used.

It should be noted that the effects described herein are not necessarily limited and any of the effects described in this disclosure may be produced.

It should be noted that the present technology can have the following configurations.

(1) An electronic apparatus, including:
an imaging section that images an object and captures image data;

a distance measurement section that measures distances from the imaging section to a plurality of measurement points on a surface of the object;

a shape estimation section that estimates a shape of the object from the measured distances; and a coordinate conversion section that performs coordinate conversion on the image data, the coordinate conversion including converting three-dimensional coordinates on the surface of the object into plane coordinates on a predetermined reference plane on the basis of the estimated shape.

(2) The electronic apparatus according (1), further including a character recognition section that recognizes a character on the surface of the object in the image data that has been subjected to the coordinate conversion.

(3) The electronic apparatus according to (1), further including an irradiation section that performs irradiation with irradiation light, in which the distance measurement section measures the distances from a phase difference between reflected light of the irradiation light and the irradiation light.

(4) The electronic apparatus according to (3), in which the imaging section performs processing of capturing the image data and processing of receiving the irradiation light.

(5) The electronic apparatus according to (3) or (4), in which the irradiation section performs irradiation with pulsed light as the irradiation light, the pulsed light being in synchronization with a predetermined cycle signal.

(6) The electronic apparatus according to any one of (3) to (5), in which the irradiation section selects spotlight or diffused light according to a predetermined operation and performs irradiation with the light as the irradiation light, and the distance measurement section measures the distances when irradiation is performed with the diffused light.

(7) The electronic apparatus according to any one of (3) to (6), in which the irradiation section starts irradiation with the irradiation light in a case where a predetermined button is pressed halfway down, and the imaging section captures the image data in a case where the predetermined button is pressed all the way down.

(8) The electronic apparatus according to any one of (1) to (7), in which the electronic apparatus is a camera unit that is attached to a wearable terminal.

(9) The electronic apparatus according to any one of (1) to (8), in which the shape estimation section estimates any one of a plurality of candidate shapes as the shape of the object on the basis of the distances.

(10) The electronic apparatus according to (9), in which the shape estimation section includes a coordinate detection section that detects coordinates of the plurality of measurement points as measured coordinates on the basis of the distances, a function acquisition section that acquires, for each of the plurality of candidate shapes, a function representing a relationship between coordinates of a candidate shape and coordinates of a predetermined reference coordinate system by using the measured coordinates, an error computation section that computes an error at a time when the shape of the object is assumed for each of the plurality of candidate shapes on the basis of the acquired function and the measured coordinates, and an estimation processing section that estimates a shape having the smallest error in the plurality of candidate shapes as the shape of the object.

(11) The electronic apparatus according to (1) or (2), in which the image data includes a plurality of pixel data, the imaging section includes phase difference detection pixels that detect a phase difference between two pupil-split images, and normal pixels that perform photoelectric conversion on light and generate any of the plurality of pixel data, and the distance measurement section measures the distances on the basis of the phase difference detected by the phase difference detection pixels.

(12) A method of controlling an electronic apparatus, including:

an imaging step of, by an imaging section, imaging an object and capturing image data;

a distance measurement step of measuring distances from the imaging section to a plurality of measurement points on a surface of the object;

a shape estimation step of estimating a shape of the object from the measured distances; and a coordinate conversion step of performing coordinate conversion on the image data, the coordinate conversion including converting three-dimensional coordinates on the surface of the object into plane coordinates on a predetermined reference plane on the basis of the estimated shape.

(13) A program for causing a computer to execute:

an imaging step of, by an imaging section, imaging an object and capturing image data;

a distance measurement step of measuring distances from the imaging section to a plurality of measurement points on a surface of the object;

a shape estimation step of estimating a shape of the object from the measured distances; and a coordinate conversion step of performing coordinate conversion on the image data, the coordinate conversion including converting three-dimensional coordinates on the surface of the object into plane coordinates on a predetermined reference plane on the basis of the estimated shape.

REFERENCE SIGNS LIST 100 electronic apparatus
101 camera unit
111, 151 operation section
112 control section
113 laser light irradiation section
114 insertion and removal section
115 diffuser plate
116 distance measurement section
117, 123 switch
118 imaging lens
119 optical character recognition section
120 translation processing section
121 sound output section
122 camera unit control section
123 display section
150 wearable terminal
152 terminal control section
155 coupling tool
156 blocking member
200 three-dimensional shape estimation section
210 measured coordinate retaining section
220 measured coordinate detection section
230 distance information retaining section 240 least-squares method computation section
250 parameter retaining section
260 error computation section
270 parameter supply section
300 imaging device
310 row scanning circuit
320 pixel array section
330 pixel circuit
331 light-receiving element
332 transfer switch
333, 334 charge storage section
335, 336 selector switch
340 timing control section
350 AD conversion section
360 column scanning circuit
370 signal processing section
380 normal pixel circuit
390 phase difference detection pixels circuit
400 coordinate conversion section
410 frame memory
420 cutout processing section
430 address conversion section

The invention claimed is:

1. An electronic apparatus, comprising:
a light source that performs irradiation with irradiation light on an object;
an imager that images the object and captures image data;
a distance measurer that measures distances from the imager to a plurality of measurement points on a surface of the object;
a shape estimator that estimates a shape of the object from the measured distances; and
a coordinate converter that performs coordinate conversion on the image data, the coordinate conversion including converting three-dimensional coordinates of the surface of the object into plane coordinates on a predetermined reference plane based on the estimated shape,
wherein the distance measurer measures the distances from a phase difference between reflected light of the irradiation light and the irradiation light, and
wherein the light source performs irradiation with a spotlight or with diffused light as the irradiation light according to a predetermined operation.

2. The electronic apparatus according to claim 1, further comprising a character recognizer that recognizes a character on the surface of the object in the image data that has been subjected to the coordinate conversion.

3. The electronic apparatus according to claim 1, wherein the imager performs a process to capture the image data and performs a process to receive light.

4. The electronic apparatus according to claim 1, wherein the light source performs irradiation with pulsed light as the irradiation light, the pulsed light being in synchronization with a predetermined cycle signal.

5. The electronic apparatus according to claim 1, wherein the distance measurer measures the distances when irradiation is performed with the diffused light.

6. The electronic apparatus according to claim 1, wherein
the light source starts irradiation with the irradiation light in a case where a predetermined button is pressed halfway down, and
the imager captures the image data in a case where the predetermined button is fully pressed down.

7. The electronic apparatus according to claim 1, wherein the electronic apparatus is a wearable camera.

8. The electronic apparatus according to claim 1, wherein the shape estimator estimates any one of a plurality of candidate shapes as the shape of the object based on the distances.

9. The electronic apparatus according to claim 8, wherein the shape estimator includes:
a coordinate detector that detects coordinates of the plurality of measurement points as measured coordinates based on the distances,
a function acquirer that acquires, for each of the plurality of candidate shapes, a function representing a relationship between coordinates of a candidate shape and coordinates of a predetermined reference coordinate system by using the measured coordinates,
an error computer that computes an error at a time when the shape of the object is assumed for each of the plurality of candidate shapes based on the acquired function and the measured coordinates, and
an estimation processor that estimates a shape having a smallest error in the plurality of candidate shapes as the shape of the object.

10. The electronic apparatus according to claim 1, wherein:
the image data includes a plurality of pixel data,
the imager includes:
phase-difference detection pixels that detect a phase difference between two pupil-split images, and
normal pixels that perform photoelectric conversion on light and generate any of the plurality of pixel data, and
the distance measurer measures the distances based on the phase difference detected by the phase difference detection pixels.

11. A method of an electronic apparatus, the method comprising:
imaging an object and capturing image data using an imager of the electronic apparatus, the object being irradiated with irradiation light during the imaging and the capturing;
measuring distances from the imager to a plurality of measurement points on a surface of the object;
estimating a shape of the object from the measured distances; and
performing coordinate conversion on the image data, the coordinate conversion including converting three-dimensional coordinates of the surface of the object into plane coordinates on a predetermined reference plane based on the estimated shape,
wherein the distances are measured from a phase difference between reflected light of the irradiation light and the irradiation light, and
wherein a spotlight or diffused light is used as the irradiation light according to a predetermined operation.

12. A non-transitory computer-readable storage medium storing code for a program that, when executed by a computer, causes the computer to perform a method of an electronic apparatus, the method comprising:
imaging an object and capturing image data using an imager of the electronic apparatus, the object being irradiated with irradiation light during the imaging and the capturing;
measuring distances from the imager to a plurality of measurement points on a surface of the object;
estimating a shape of the object from the measured distances; and
performing coordinate conversion on the image data, the coordinate conversion including converting three-dimensional coordinates of the surface of the object into plane coordinates on a predetermined reference plane based on the estimated shape, wherein the distances are measured from a phase difference between reflected light of the irradiation light and the irradiation light, and wherein a spotlight or diffused light is used as the irradiation light according to a predetermined operation.

* * * * *